United States Patent
Thorne et al.

(10) Patent No.: US 11,932,332 B2
(45) Date of Patent: Mar. 19, 2024

(54) THREE-PISTON ANKLE MECHANISM OF A LEGGED ROBOT AND ASSOCIATED CONTROL SYSTEM

(71) Applicant: Boston Dynamics, Inc., Waltham, MA (US)

(72) Inventors: Christopher Everett Thorne, Sommerville, MA (US); John Aaron Saunders, Arlington, MA (US); Marco da Silva, Arlington, MA (US); Thomas H. Miller, Arlington, MA (US); Alexander Douglas Perkins, Arlington, MA (US)

(73) Assignee: Boston Dynamics, Inc., Waltham, MA (US)

( * ) Notice: Subject to any disclaimer, the term of this patent is extended or adjusted under 35 U.S.C. 154(b) by 387 days.

(21) Appl. No.: 17/229,363

(22) Filed: Apr. 13, 2021

(65) Prior Publication Data

US 2021/0229766 A1 Jul. 29, 2021

Related U.S. Application Data

(60) Continuation of application No. 15/846,726, filed on Dec. 19, 2017, now Pat. No. 10,988,192, which is a
(Continued)

(51) Int. Cl.
*B62D 57/032* (2006.01)
*B25J 9/16* (2006.01)

(52) U.S. Cl.
CPC ............. *B62D 57/032* (2013.01); *B25J 9/162* (2013.01); *B25J 9/1633* (2013.01); *Y10S 901/01* (2013.01); *Y10S 901/28* (2013.01)

(58) Field of Classification Search
CPC ........ B62D 57/02; B62D 57/032; B25J 9/162; B25J 9/1633
(Continued)

(56) References Cited

U.S. PATENT DOCUMENTS 3,871,032 A 3/1975 Karas
4,578,083 A 3/1986 Williams
(Continued)

OTHER PUBLICATIONS

Versluys et al., "Intelligent Prosthesis Actuated by Pleated Pneumatic Artificial Muscles: Objectives and Mechanical Concepts," <http://mech.vub.ac.be/mulfibody/publicafionsgull_texts/clawar. pdf., > pp. 1-9.

*Primary Examiner* — Kevin Hurley
(74) *Attorney, Agent, or Firm* — Knobbe Martens Olson & Bear LLP

(57) ABSTRACT

An example robot includes a first actuator and a second actuator connecting a first portion of a first member of the robot to a second member of the robot. Extension of the first actuator accompanied by retraction of the second actuator causes the first member to roll in a first roll direction. Retraction of the first actuator accompanied by extension of the second actuator causes the first member to roll in a second roll direction. A third actuator connects a second portion of the first member to the second member. Extension of the third actuator accompanied by retraction of both the first and second actuators causes the first member to pitch in a first pitch direction. Retraction of the third actuator accompanied by extension of both the first and second actuators causes the first member to pitch in a second pitch direction.

21 Claims, 17 Drawing Sheets

Related U.S. Application Data division of application No. 14/878,007, filed on Oct. 8, 2015, now Pat. No. 9,878,751.

(58) Field of Classification Search
USPC ............ 318/568.12, 568.17, 568.18, 568.22
See application file for complete search history.

(56) References Cited

U.S. PATENT DOCUMENTS

| | | |
|---|---|---|
| 4,776,852 A | 10/1988 | Bubic |
| 5,551,525 A | 9/1996 | Pack et al. |
| 5,758,734 A | 6/1998 | Hong et al. |
| 6,443,993 B1 | 9/2002 | Koniuk |
| 6,491,119 B1 | 12/2002 | Neu |
| 7,025,792 B2 * | 4/2006 | Collier .................. A61F 2/6607 623/33 |
| 7,099,743 B2 | 8/2006 | Lee et al. |
| 7,118,601 B2 | 10/2006 | Yasui et al. |
| 7,313,463 B2 | 12/2007 | Herr et al. |
| 7,641,700 B2 | 1/2010 | Yasui |
| 8,554,366 B2 | 10/2013 | Kajima |
| 8,828,095 B2 | 9/2014 | Mosler et al. |
| 8,870,967 B2 | 10/2014 | Herr et al. |
| 8,965,573 B2 | 2/2015 | Maisonnier et al. |
| 9,043,029 B2 | 5/2015 | Seo |
| 9,073,209 B2 | 7/2015 | Lee et al. |
| 9,731,416 B1 * | 8/2017 | Saunders .................. B25J 9/14 |
| 10,646,358 B2 * | 5/2020 | Goldfarb .................. A61F 2/60 |
| 2004/0064195 A1 | 4/2004 | Herr |
| 2004/0083007 A1 | 4/2004 | Molino et al. |
| 2005/0240307 A1 | 10/2005 | Kuroki et al. |
| 2007/0123997 A1 | 5/2007 | Herr et al. |
| 2007/0162152 A1 | 7/2007 | Herr et al. |
| 2007/0220637 A1 | 9/2007 | Endo et al. |
| 2009/0237025 A1 | 9/2009 | Takenaka et al. |
| 2012/0316684 A1 | 12/2012 | Lee et al. |
| 2013/0013112 A1 | 1/2013 | Darish |
| 2013/0173022 A1 | 7/2013 | Arabian et al. |
| 2014/0074243 A1 | 3/2014 | Holgate |
| 2014/0263883 A1 | 9/2014 | Rushworth et al. |
| 2014/0379198 A1 | 12/2014 | Amino et al. |
| 2015/0122559 A1 | 5/2015 | Nagatsuka |
| 2016/0096267 A1 | 4/2016 | Kaneko et al. |

\* cited by examiner

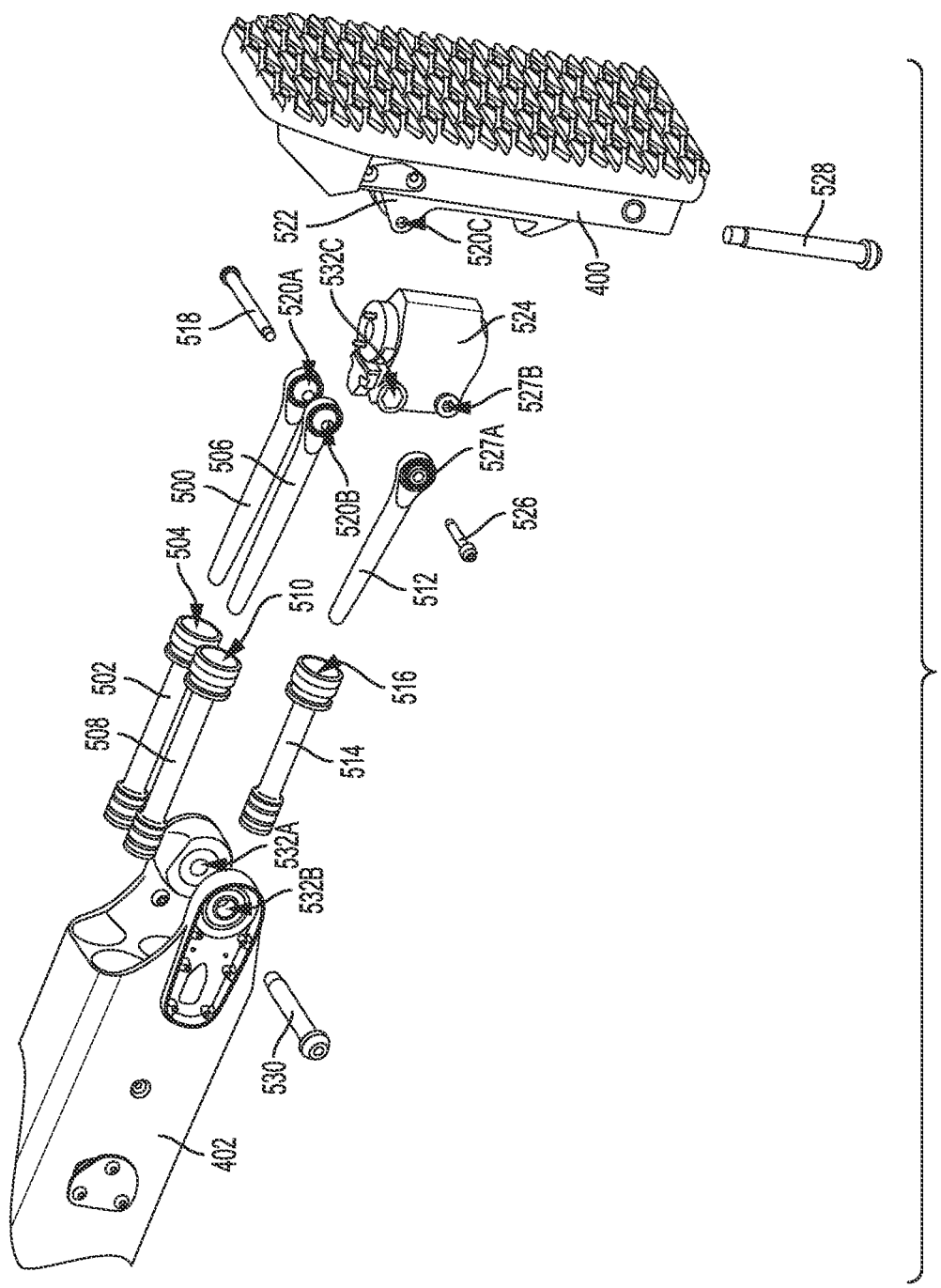

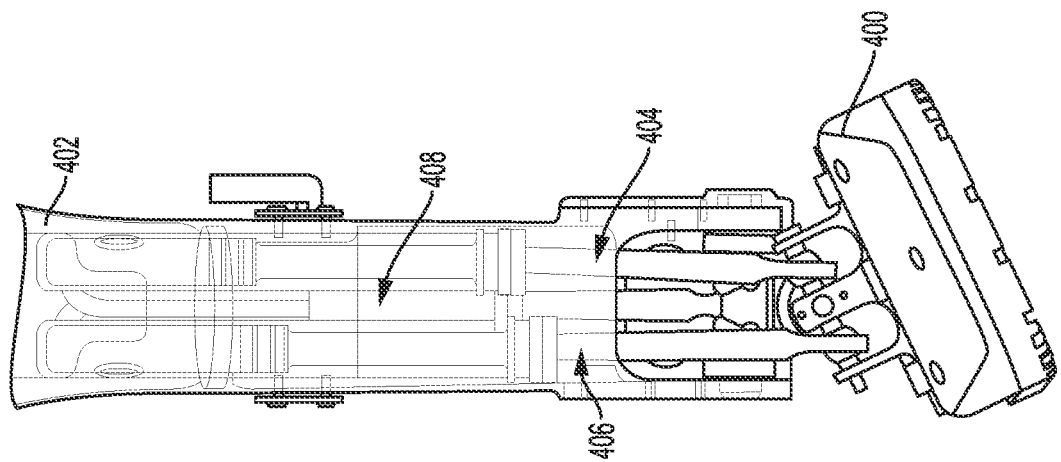
Roll: +/-25 Degrees
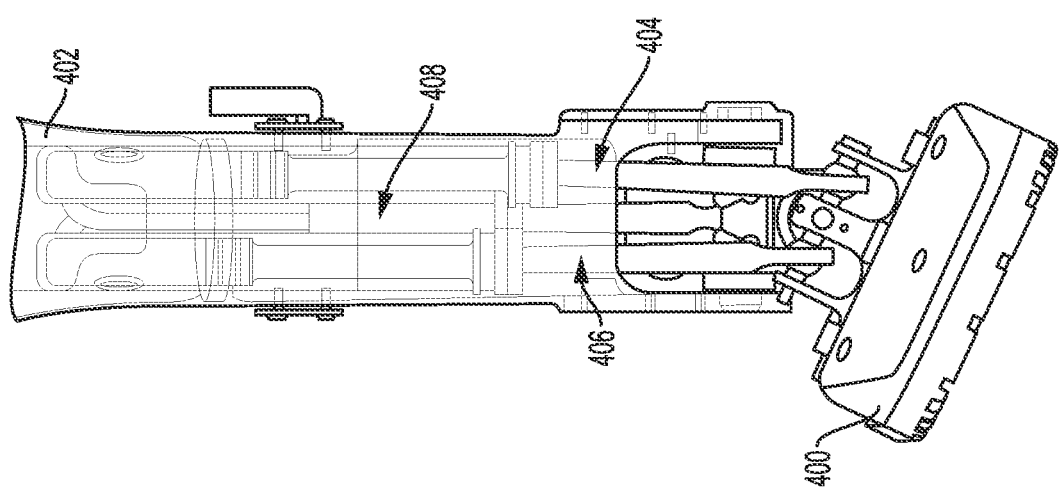

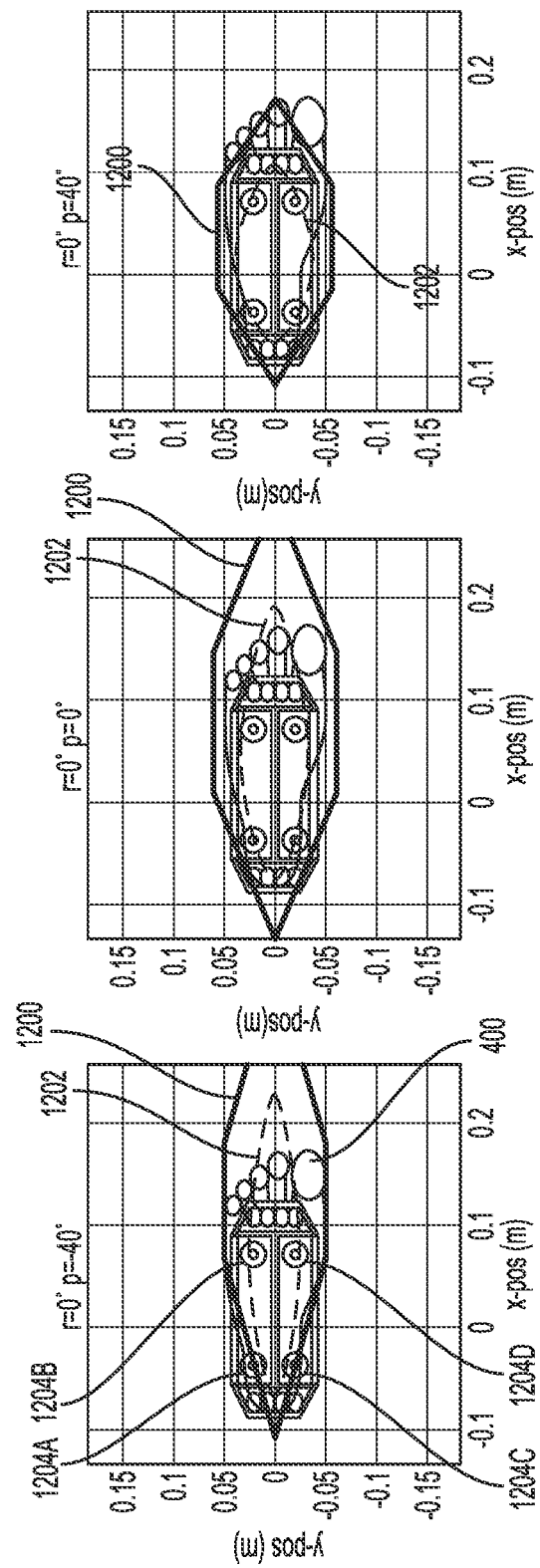

THREE-PISTON ANKLE MECHANISM OF A LEGGED ROBOT AND ASSOCIATED CONTROL SYSTEM

CROSS REFERENCE TO RELATED APPLICATIONS

This U.S. patent application is a continuation of, and claims priority under 35 U.S.C. § 120 from, U.S. patent application Ser. No. 15/846,726, filed on Dec. 19, 2017, which is a continuation of U.S. patent application Ser. No. 14/878,007, filed on Oct. 8, 2015. The disclosures of these prior applications are considered part of the disclosure of this application and are hereby incorporated by reference in their entireties.

BACKGROUND

A robot may have a plurality of members composing the robot's legs and arms. The robot may be configured to perform tasks that involve walking, running, standing in position, grasping objects, etc. To perform these tasks, a controller of the robot may actuate one or more of the members of the robot. For instance, controller may actuate the legs so as to cause the robot to take steps toward a particular location while maintaining its balance.

SUMMARY

The present disclosure describes implementations that relate to a three-piston ankle mechanism of a legged robot and associated control system. In a first example implementation, the present disclosure describes a robot. The robot includes a first actuator and a second actuator connecting an anterior portion of a first member of the robot to a second member of the robot. Extension of the first actuator accompanied by retraction of the second actuator causes the first member to roll in a first roll direction relative to the second member. Retraction of the first actuator accompanied by extension of the second actuator causes the first member to roll in a second roll direction opposite to the first roll direction relative to the second member. The robot also includes a third actuator connecting a posterior portion of the first member to the second member. Extension of the third actuator accompanied by retraction of one of or both the first and second actuators causes the first member to pitch in a first pitch direction relative to the second member. Retraction of the third actuator accompanied by extension of one of or both the first and second actuators causes the first member to pitch in a second pitch direction opposite to the first pitch direction relative to the second member.

In a second example implementation, the present disclosure describes performing the following operations: (i) determining a desired location for a center of pressure of a foot of a robot operating on a surface, where the robot includes: (a) a first actuator and a second actuator connecting a first portion of the foot to a shin of the robot, where extension of the first actuator accompanied by retraction of the second actuator causes the foot to roll in a first roll direction relative to the shin, and where retraction of the first actuator accompanied by extension of the second actuator causes the foot to roll in a second roll direction opposite to the first roll direction relative to the shin, and (b) a third actuator connecting a second portion of the foot to the shin, where extension of the third actuator accompanied by retraction of one of or both the first and second actuators causes the foot to pitch in a first pitch direction relative to the shin, and where retraction of the third actuator accompanied by extension of one of or both the first and second actuators causes the foot to pitch in a second pitch direction opposite to the first pitch direction relative to the shin; (ii) determining pitch and roll torques to be applied by the foot on the surface to cause a location of the center of pressure to be within a threshold distance from the desired location; and (iii) actuating at least one of the first, second, and third actuators to cause the foot to apply the determined pitch and roll torques.

In a third example implementation, the present disclosure describes a non-transitory computer readable medium having stored therein instructions that, when executed by a computing device, cause the computing device to perform operations in accordance with the second example implementation.

A fourth example implementation may include a system having means for performing operations in accordance with the second example implementation The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 5 illustrates an exploded view of the leg illustrated in FIG. 4, in accordance with an example implementation.

FIGS. 7A-7B illustrate the foot rolling relative to the shin, in accordance with an example implementation.

FIGS. 12A, 12B, and 12C illustrate possible locations of the center of pressure of the foot based on pitch and roll angles of the foot, in accordance with an example implementation.

DETAILED DESCRIPTION

The following detailed description describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. EXAMPLE ROBOTIC SYSTEMS

Figure 1:
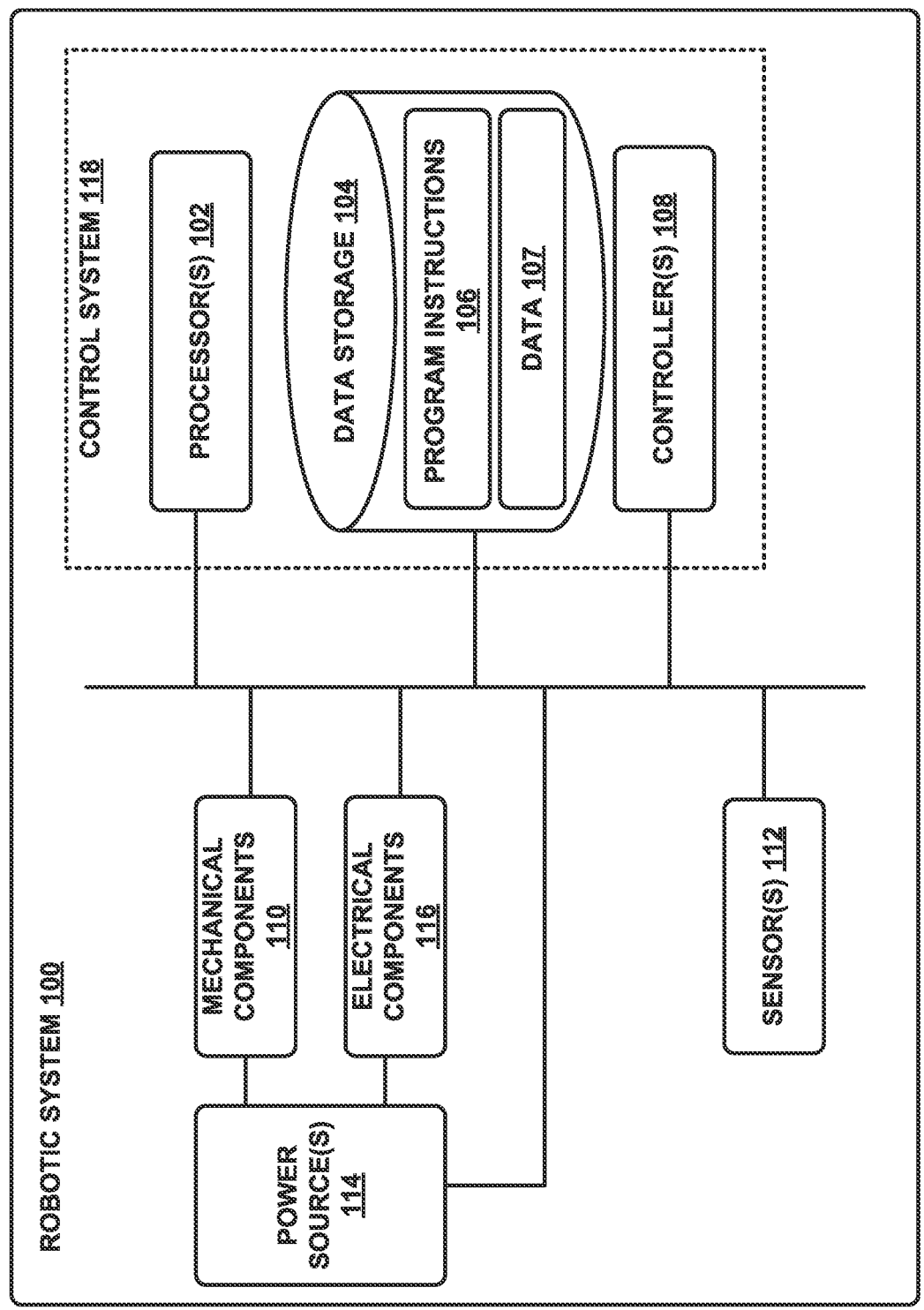
FIG. 1 illustrates an example configuration of a robotic system, in accordance with an example implementation.

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic system 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic system 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic system 100, such as on the body and/or on one or more of the appendages, among other examples.

On its body, the robotic system 100 may carry a load, such as a type of cargo that is to be transported. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
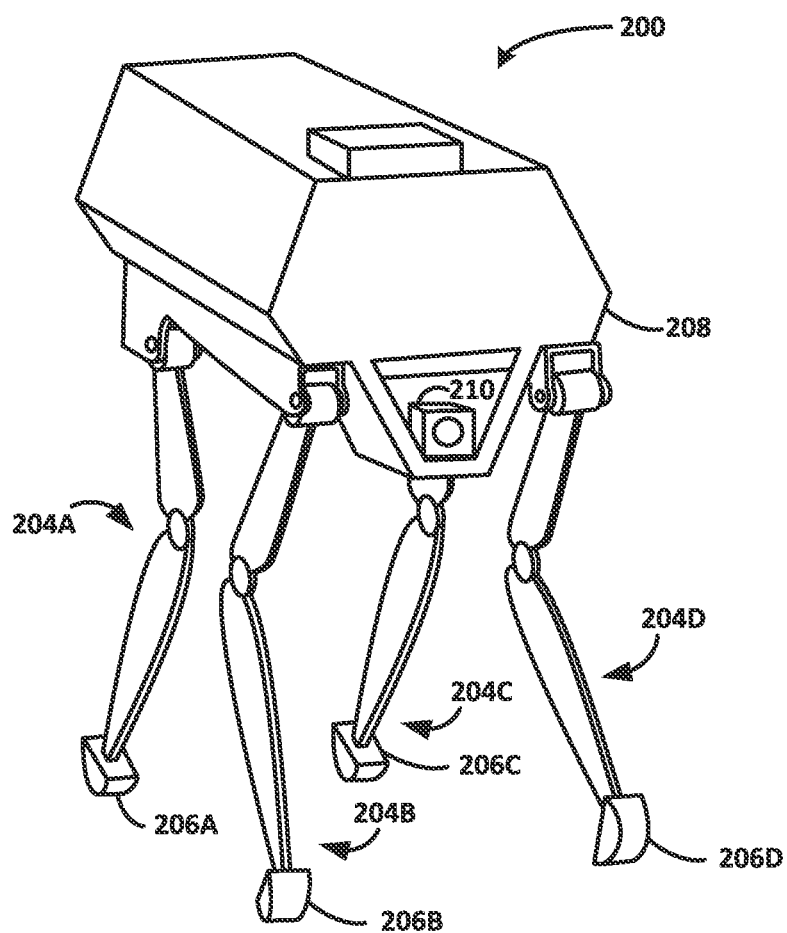
FIG. 2 illustrates a quadruped robot, in accordance with an example implementation.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
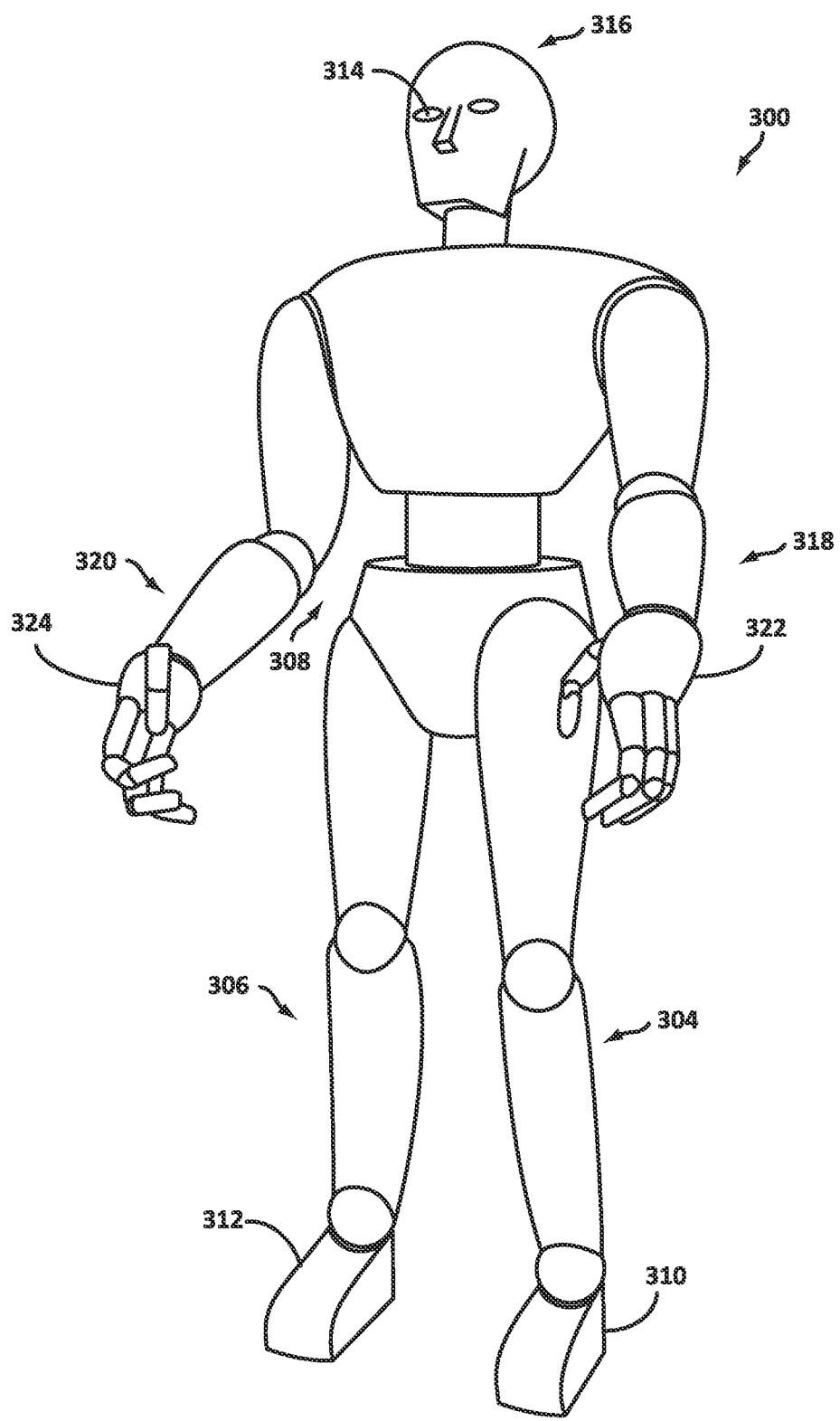
FIG. 3 illustrates a biped robot, in accordance with another example implementation.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 (or end-effectors) for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

II. EXAMPLE THREE-PISTON ANKLE MECHANISM OF A LEGGED ROBOT

In examples, a controller of a legged robot may be configured to control the robot to move about on its legs or be in a stance position while maintaining its balance. An example robot may be a bipedal robot having two legs, a quadruped robot having four legs, among other possibilities. The controller may be configured to enable the robot to stand, walk, trot, or run in a given directions.

A leg of an example robot may have several members or links, such as a foot and a shin. The foot and shin may be connected at an ankle joint such that the ankle joint controls one or more angles of the foot relative to the shin. In examples, ankle joints use hydraulic power to apply a torque on the foot during liftoff, touchdown, and stance phases of a step taken by the robot. But other sources of power may be used.

Figure 4:
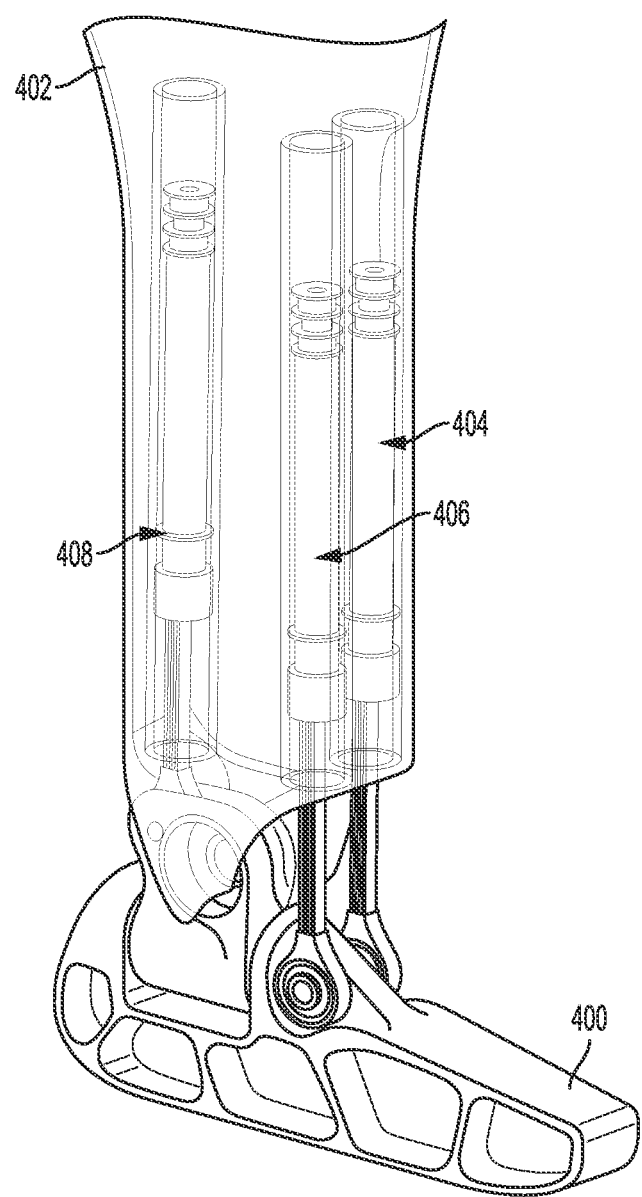
FIG. 4 illustrates an example foot of a robot connected to a shin of a robot by way of three actuators, in accordance with an example implementation.

FIG. 4 illustrates an example foot 400 of a robot connected to a shin 402 of a robot by way of three actuators, in accordance with an example implementation. The foot 400 and the shin 402 may for example be the foot and shin of the robot 300.

Two linear actuators, 404 and 406, connect a first portion, e.g., an anterior portion, of the foot 400 to the shin 402. A third linear actuator 408 connects a second portion, e.g., posterior portion, of the foot 400 to the shin 402. The two linear actuators 404 and 406 are shown connected to an anterior portion of the foot 400 and the third actuator 408 is shown connected to a posterior portion of the foot 400 as an illustration. In other implementations, the two linear actuators 404 and 406 could be connected to a posterior portion of the foot 400 and the third actuator 408 could be connected to an anterior portion of the foot 400. In some examples, the third actuator 408 may be connected to an intermediate member (e.g., a talus) as described below with respect to FIG. 5. In the description herein, the actuator 404 is referred to as the left actuator, the actuator 406 is referred to as the right actuator, and the actuator 408 is referred to as the hind actuator.

FIG. 5 illustrates an exploded view of the leg illustrated in FIG. 4, in accordance with an example implementation. In the example implementation of FIG. 5, the left actuator 404 includes a left connecting rod 500 connected to a left piston 502 by way of a spherical joint 504. Similarly, the right actuator 406 includes a right connecting rod 506 connected to a right piston 508 by way of a spherical joint 510. The hind actuator 408 also includes a hind connecting rod 512 connected to a hind piston 514 by way of a spherical joint 516. In examples, the pistons 502, 508, and 514 may be of a push-only type pistons. In these examples, the spherical joints 504, 510, and 516 may be of a ball-and-socket type. This construction allows for zero backlash in the joints to enable more accurate control of respective positions of the pistons 502, 508, and 514. However, other constructions are possible.

The connecting rods 500 and 506 are coupled to the foot 400 by way of a bolt 518 inserted in holes 520A and 520B in the connecting rods 500 and 506, respectively, and corresponding hole(s) 520C in a bracket 522 coupled to the foot 400. The hind connecting rod 512 is coupled to an intermediate member or talus 524 by way of a bolt 526 inserted in a hole 527A in the hind connecting rod 512 and corresponding hole(s) 527B in the talus 524. The talus 524 in turn is coupled or assembled to the foot 400 by way of a bolt 528 inserted through holes (not shown) in the talus 524 and the foot 400.

Further, the shin 402 is coupled to the talus 524 by way of a bolt 530 inserted through holes 532A and 532B in the shin 402 and corresponding hole(s) 532C in the talus 524. In this manner, motion of the left and right actuators 404 and 406 in opposite directions relative to each other causes the foot 400 to roll relative to the talus 524. Motion of the hind actuator 408 in an opposite direction relative to motion of at least one of the left actuator 404 and the right actuator 406 causes an assembly of the foot 400 and the talus 524 to pitch forward or backward.

The construction shown in FIG. 5 is shown as an example implementation for illustration, and is not meant to be limiting. Other construction features and configurations could be implemented.

Figure 6B:
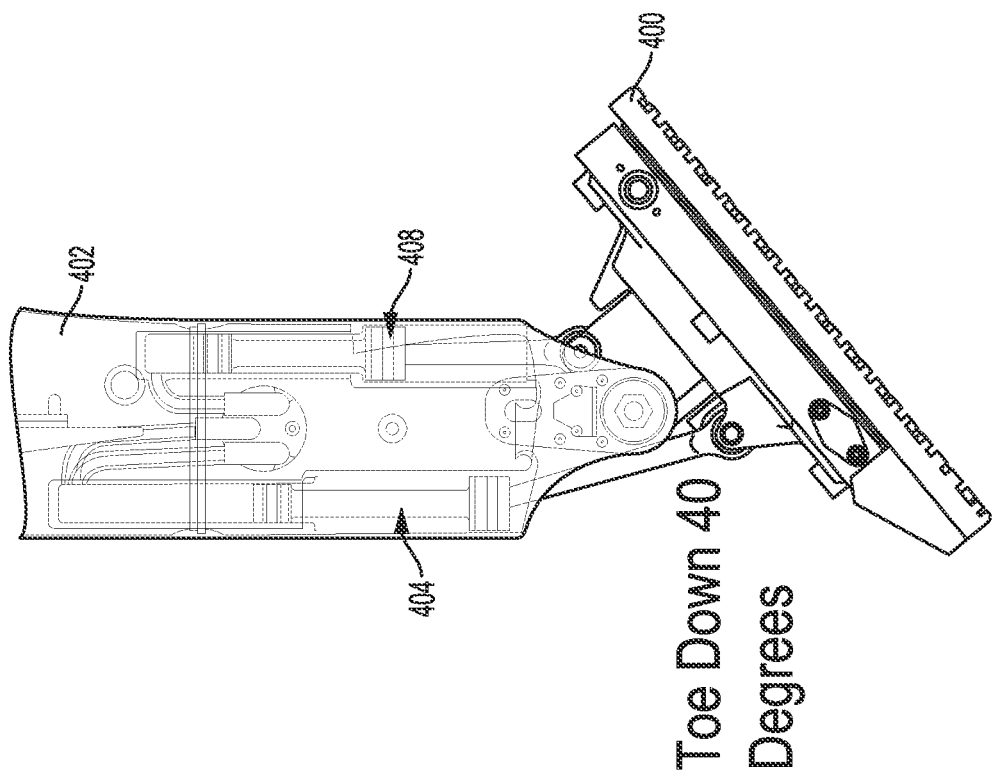
FIGS. 6A-6B illustrate the foot pitching backward and forward relative to the shin, in accordance with an example implementation.
Figure 6A:
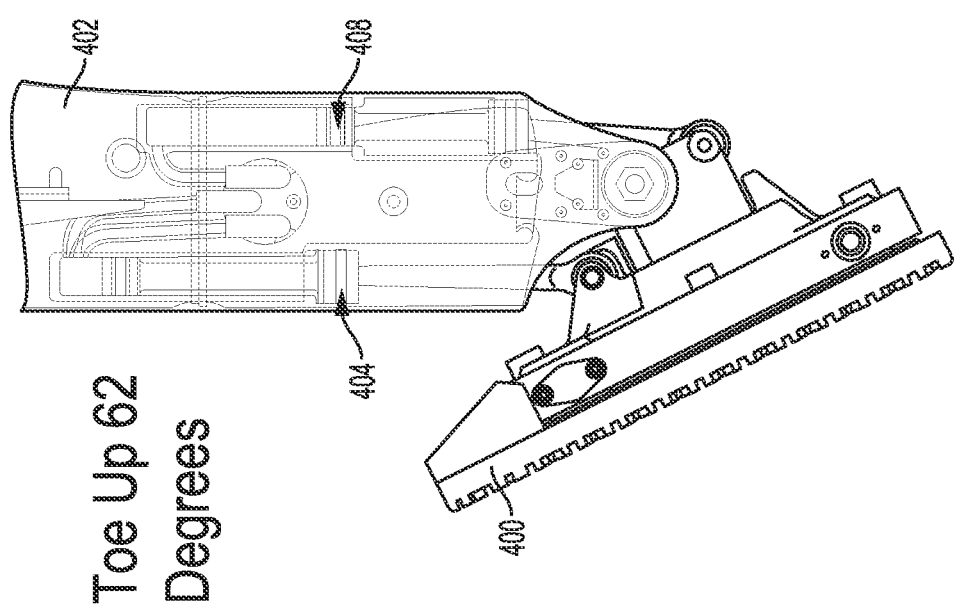

A controller (e.g., the controller 108) of the robot having the leg shown in FIGS. 4 and 5 can change pitch and roll angles of the foot 400 relative to shin 402 by commanding the actuators 404, 406, and 408. FIGS. 6A-6B illustrate the foot 400 pitching backward and forward relative to the shin 402, in accordance with an example implementation. Particularly, FIG. 6A illustrates a side view of the leg illustrated in FIGS. 4 and 5 while the foot 400 is pitched backward (toe-up), while FIG. 6B illustrates the side view of the leg while the foot 400 is pitched forward (toe-down).

To cause the foot 400 to pitch backward (i.e., toe-up) as shown in FIG. 6A, the controller may command both the left and right actuators 404 and 406 to retract, while commanding the hind actuator 408 to extend. To cause the foot to pitch forward (i.e., toe-down) as shown in FIG. 6B, the controller may command both the left and right actuators 404 and 406 to extend, while commanding the hind actuator 408 to retract. In examples, the controller may only command the left and right actuators 404 and 406 to extend or retract. In response, the hind actuator 408 may move in the opposite direction without being commanded, by virtue of the motion of the foot 400.

In some examples, the extent of pitching forward may be different from the extent of pitching backward based on a range of extension and retraction of the actuators 404, 406, and 408 and based on geometry of the ankle relative to the foot 400 and shin 402. For instance, as shown in FIG. 6A, the foot 400 can pitch backward, i.e., toe-up, for an angle of about 62°. However, as shown in FIG. 6B, the foot 400 can pitch forward, i.e., toe-down for an angle of about 40°.

FIGS. 7A-7B illustrate the foot 400 rolling relative to the shin 402, in accordance with an example implementation. Particularly, FIG. 7A illustrates a front view of the leg illustrated in FIGS. 4 and 5 while the foot 400 is rolled leftward (clockwise) from a perspective of a person looking at FIG. 7A. On the other hand, FIG. 7B illustrates the front view of the leg while the foot 400 is rolled rightward (counter-clockwise) from a perspective of a person looking at FIG. 7B.

To cause the foot 400 to roll leftward as shown in FIG. 7A, the controller may command the left actuator 404 to extend, while commanding the right actuator 406 to retract. To cause the foot 400 to roll right as shown in FIG. 7B, the controller may command the right actuator 406 to extend, while commanding the left actuator 404 to retract. In other examples, however, the controller may command on of the actuators 404 and 406 to extend or retract, and the other actuator may in response move in the opposite direction as the foot 400 rolls.

In some examples, the extent of rolling leftward may be different from the extent of rolling rightward based on a range of extension and retraction of the actuators 404 and 406 and geometry of the ankle joint. In other examples, the extent of rolling leftward may be substantially the same as (e.g., within a threshold number of degrees, such as 1°-5°, from) the extent of rolling rightward. For instance, as shown in FIGS. 7A and 7B, the foot 400 can roll leftward and rightward by the same angle of about 25°.

The controller can cause simultaneous roll and pitch movements by commanding all three actuators 404, 406, and 408. As an example, the controller may cause the foot 400 to roll leftward while pitching forward by extending the actuator 404, while retracting both the actuator 408 and 406.

The actuators 404, 406, and 408 could be any type of linear actuators. For example, the actuators 404, 406, and 408 could be electromechanical actuators operated by an electric motor and a spindle. In another example, the robot may include a hydraulic system that drives the actuators 404, 406, and 408. In this example, the actuators 404, 406, and 408 may be single-acting or double-acting. The actuators 404, 406, and 408 may be of the same type or of different types.

Figure 8A:
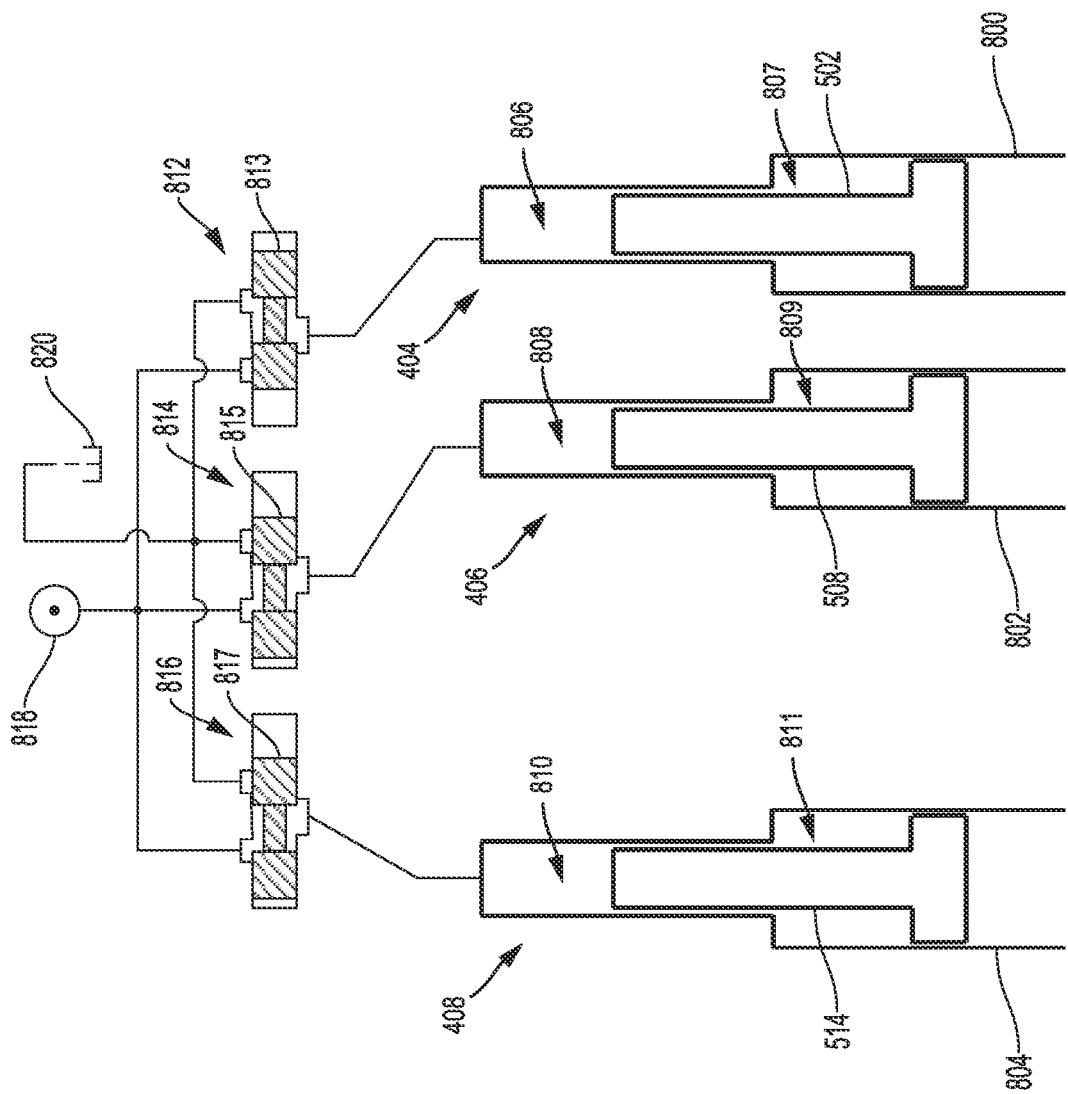
FIG. 8A illustrates an example hydraulic system configured to operate three actuators, in accordance with an example implementation.

FIG. 8A illustrates an example hydraulic system configured to operate the actuators 404, 406, and 408, in accordance with an example implementation. As shown in FIG. 8A, the piston 502 of the actuator 404 is slidably accommodated inside a cylinder 800. Similarly, the piston 508 of the actuator 406 is slidably accommodated inside a respective cylinder 802, and the piston 514 of the actuator 408 is slidably accommodated inside a respective cylinder 804. The cylinder 800 and the piston 502 define chambers 806 and 807. The cylinder 802 and the piston 508 define chambers 808 and 809. The cylinder 804 and the piston 514 define chambers 810 and 811.

FIG. 8A also shows three spool valves 812, 814, and 816 having linearly movable spools 813, 815, and 817, respectively. The three spool valves 812, 814, and 816 are each connected to a high pressure fluid source 818 and a low pressure fluid reservoir 820. The high pressure fluid source 818 may contain or provide pressurized fluid, and the low pressure fluid reservoir 820 may contain fluid having pressure lower than that of the pressurized fluid of the high pressure fluid source 818.

As an example for illustration, the high pressure fluid source 818 may be a pump driven by a motor or an engine and configured to supply hydraulic fluid at a pressure of 3000 pounds per square inch (psi). The low pressure fluid reservoir 820 may include hydraulic fluid at a pressure of 100 psi. These pressure levels are examples only, and other pressure levels are contemplated as well. In other examples, the high pressure fluid source 818 may be an accumulator. In other examples, the high pressure fluid source 818 may include a combination of a pump and an accumulator. In still other examples, the high pressure fluid source 818 may be a hydraulic line (e.g., pressure rail) connected to a remote source of hydraulic fluid.

Linear positions of the spools 813, 815, and 817 determine whether high pressure fluid is communicated to the chambers 806, 808, and 810, respectively. As shown in FIG. 8A, the chambers 808 and 810 are hydraulically connected to the high pressure fluid source 818, while the chamber 806 is hydraulically connected to the low pressure fluid reservoir 820. Thus, high pressure fluid is communicated to the chambers 808 and 810 causing the pistons 508 and 514 to extend (move downward in FIG. 8A). In response, the foot 400 may pitch backward (toe-up) while rolling rightward.

As a result, fluid in the chambers 806 is discharged (i.e., forced out) and is communicated to the low pressure fluid reservoir 820 and the piston 502 retracts (moves upward in FIG. 8A).

Thus, by controlling linear positions of the spools 813, 815, and 817, a controller of the robot may achieve a combination of the motions illustrated in FIGS. 6A-6B and FIGS. 7A-7B. The controller may control the linear positions of the spools 813, 815, and 817 by way of solenoids, stepper motors, or any other actuation techniques (not shown). Also, the valves 812, 814, and 816 are depicted as spool valves; however, other types of valve such as rotary valves or poppet valves could be used.

In examples, instead of communicating fluid to and from the chambers 806, 808, and 810, fluid could be communicated to and from the chambers 807, 809, and 811. In other examples, valves (not shown) could be added to the hydraulic system shown in FIG. 8A to select between communicating fluid to the chambers 806 or 807, 808 or 809, and 810 or 811. Further, other actuator configurations with different piston configurations could be used as well.

Figure 8B:
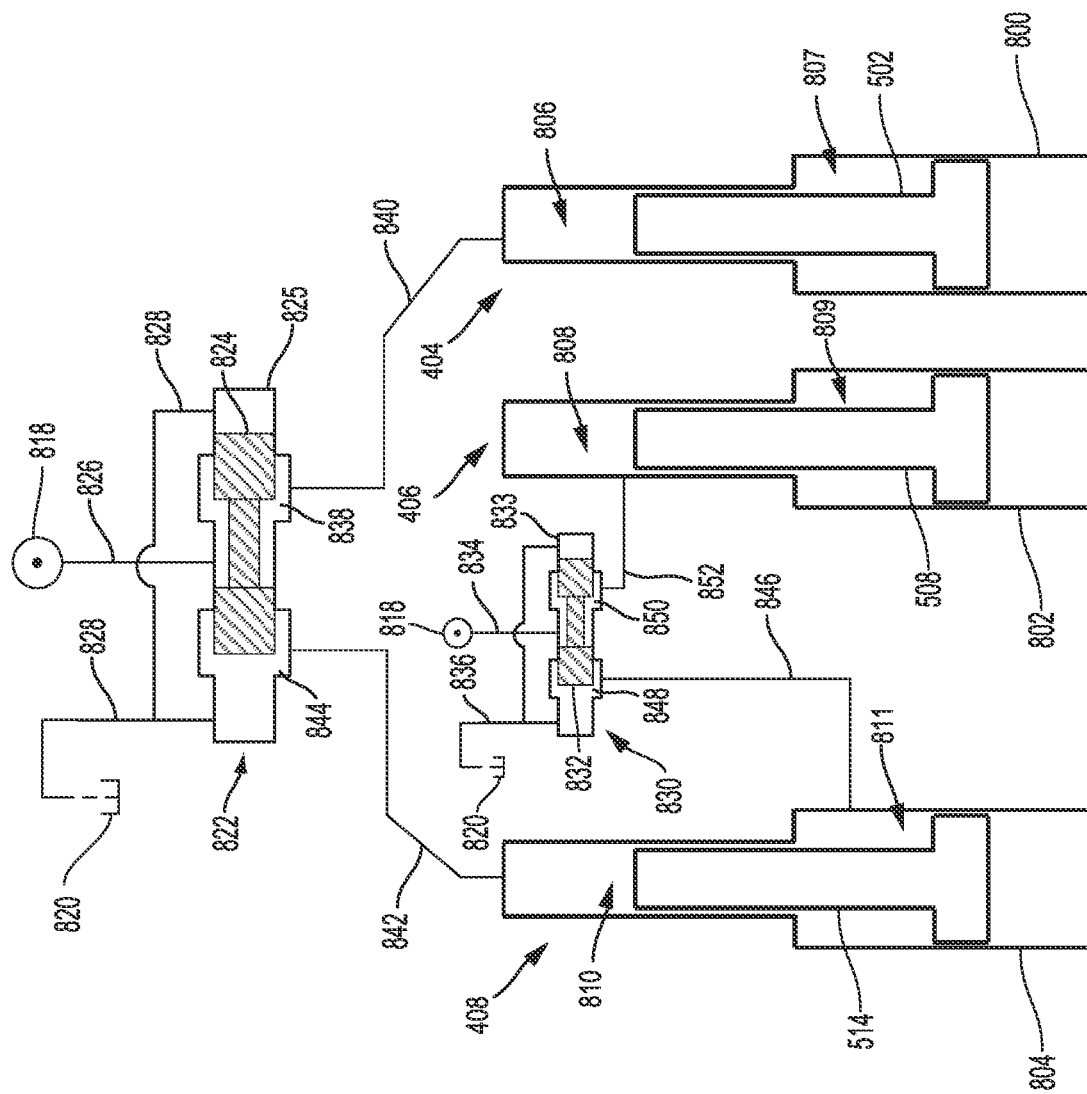
FIG. 8B illustrates another example hydraulic system configured to operate three actuators, in accordance with an example implementation.

Although FIG. 8A illustrates three-way spool valves controlling flow of fluid to and from the actuators 404, 406, and 408, other valve configurations could be used. To that point, FIG. 8B illustrates another example hydraulic system, in accordance with an example implementation. As depicted in FIG. 8B, a four-way spool valve 822 has a spool 824 slidably accommodated within a body 825 of the valve 822. An electric solenoid, a stepper motor, a hydraulic actuator, or any other actuation device may be used for moving the spool 824 within the body 825 of the valve 822. The linear position of the spool 822 controls hydraulic fluid flow from the high pressure fluid source 818 through a hydraulic supply line 826 to one of the two chambers 806 and 810. The linear position of the spool 824 further controls flow of hydraulic fluid forced out from the other chamber to the low pressure fluid reservoir 820 through a hydraulic return line 828. The high pressure fluid source 818 and the low pressure fluid reservoir 820 are duplicated closer to the valve 830 in FIG. 8B to reduce visual clutter in FIG. 8B.

The hydraulic system in FIG. 8B further includes another four-way spool valve 830 having a spool 832 slidably accommodate within a body 833 of the valve 830. An electric solenoid, a stepper motor, a hydraulic actuator, or any other actuation device may be used for moving the spool 832 within the body 833 of the valve 830. The linear position of the spool 832 controls hydraulic fluid flow from the high pressure fluid source 818 through a hydraulic supply line 834 to one of the two chambers 808 and 811. The linear position of the spool 832 further controls flow of hydraulic fluid forced out from the other chamber to the low pressure fluid reservoir 820 through a hydraulic return line 836.

As shown in FIG. 8B, the spool 824 is shifted to a given linear position so as to allow hydraulic fluid flow from the high pressure fluid source 818 through the hydraulic supply line 826, an opening 838, and a hydraulic line 840 to the chamber 806. Such high pressure fluid flowing into the chamber 806 pushes against the piston 502, causes the piston 502 to move in a downward direction, and causes the chamber 806 to expand. Motion of the piston 502 downward may cause the foot 400 to pitch forward, and thus cause the piston 514 of the hind actuator 408 to move upward. Upward motion of the piston 514 causes the chamber 810 to contract, forcing hydraulic fluid out from the chamber 810 through a hydraulic line 842 and an opening 844 to flow through the hydraulic return line 828 to the low pressure fluid reservoir 820.

As the piston 514 moves upward, when the spool 832 is shifted within the body 833 of the valve 830 as shown in FIG. 8B, fluid in the chamber 811 is forced out through a hydraulic line 846, an opening 848, and the hydraulic line 836 to the low pressure fluid reservoir 820. Also, hydraulic fluid flows from the high pressure fluid source 818 through the hydraulic supply line 834, an opening 850, and a hydraulic line 852 to the chamber 808. Such high pressure fluid flowing into the chamber 808 pushes against the piston 508, causes the piston 508 to move in a downward direction, and causes the chamber 808 to expand. In this manner, both the pistons 502 and 508 extend, while the piston 514 retracts. The foot 400 thus pitches forward. In this configuration of FIG. 8B, motion of the piston 514 is coupled to motion of the pistons 502 and 508 such that the piston 514 moves in an opposite direction from the pistons 502 and 508. Positions of the spools 824 and 832 shown in FIG. 8B are examples for illustration. Shifting the spools 824 and 832 to different linear positions within the respective valve bodies 825 and 833 may cause the foot 400 to roll or to perform a combination of pitch and roll motions.

III. EXAMPLE FOOT POSITION/ORIENTATION CONTROL SYSTEM

As described above, the three actuators 404, 406, and 408 control pitch and roll angles of the foot 400, and may thus control orientation of the foot 400. For instance, the robot may be taking a step, e.g., while walking, running, or climbing stair steps. During a portion of the step, the foot 400 may not be contacting a surface, i.e., the foot 400 may be in the air between a lift-off phase and a touch-down phase of the step. The controller of the robot may seek to orientate the foot 400 in a specific orientation while the foot 400 is in the air. For example, before the foot 400 touches down on a surface, the controller may seek to orientate the foot 400 in a position appropriate for a contour of the surface on which the foot 400 is about to land. To place the foot 400 in such a position, the controller may operate the actuators 404, 406, and 408 so as to orientate the foot 400 at particular pitch and roll angles with respect to the shin 402.

In another example, the controller may seek to orientate the foot 500 while in contact with a surface to perform admittance control. Particularly, the controller may command the foot 400 to apply a desired torque on the surface. The controller may receive feedback information by way of sensor measurements indicating that the torque being applied by the foot 400 is not the desired torque. Based on the error or discrepancy between the desired torque and the measured torque, the controller determines a modified velocity for the foot 400 that would reduce or eliminate the error in the torque. The controller then determines a position or orientation for the foot 400 to achieve the modified desired velocity (e.g., the controller may integrate the modified velocity to determine a desired position or orientation for the foot 400). The controller then operates the actuators 404, 406, and 408 to achieve such desired orientation of the foot 400. Thus, there are scenarios where the controller may seek to place the foot 400 in a particular orientation to achieve a particular control objective.

Figure 9:
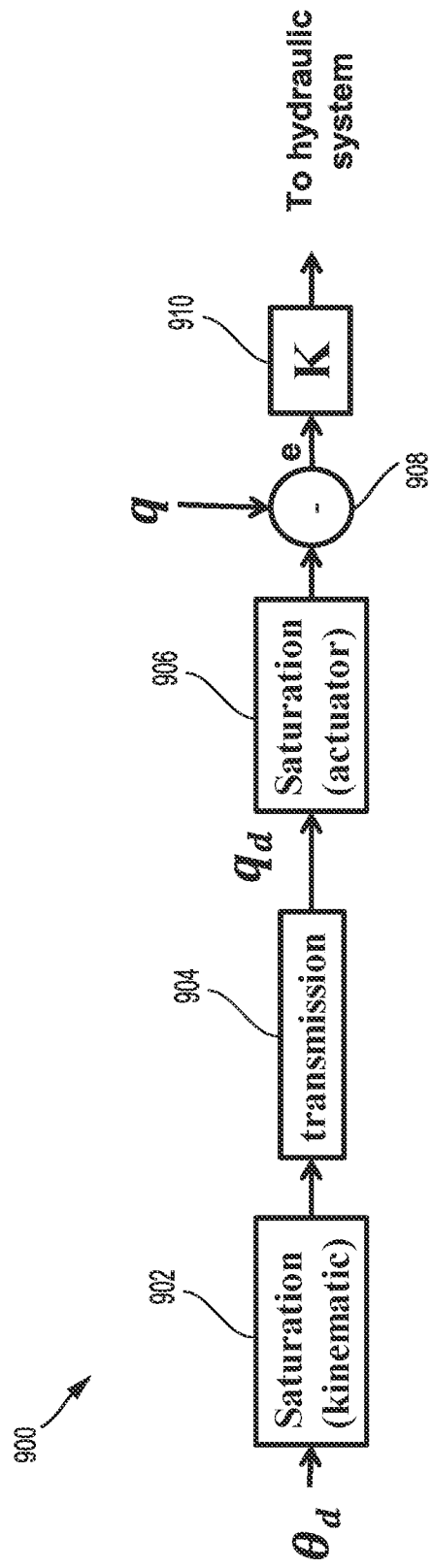
FIG. 9 illustrates an example control system for orientation of the foot, in accordance with an example embodiment.

FIG. 9 illustrates an example control system 900 of orientation of the foot 400, in accordance with an example embodiment. The controller of the robot may determine desired pitch and roll angles $\theta_d$ for the foot 400 that corresponds to a desired orientation of the foot 400. Thus, $\theta_d$ may represent a vector that includes at least two elements, a pitch angle and a roll angle.

The range of pitch and roll angles could be physically limited. For example, as shown in FIGS. 6A-6B, the pitch angle could be limited to between about 62° toe-up angle and a 40° toe-down angle. Similarly, as shown in FIGS. 7A-7B, the roll angle could be limited to an angle between +25° and −25°. These angle limitations are determined based on limits on the extent of extension and retraction of the actuators 404, 406, and 408 as well as geometry of the ankle joint.

A block 902 of the control system 900 is configured to perform a kinematic saturation to limit the desired angles $\theta_d$ based on physical constraints on range of angles of the foot 400. For instance, if the desired roll angle is more than 25°, the controller limits the angle to 25° at the block 902.

At block 904, the controller transforms or transmits the desired angles $\theta_d$, which are defined in an angular space of the foot 400, to desired generalized coordinates $q_d$ defined in a linear space of the actuators 404, 406, and 408. Particularly, desired roll and pitch angles $\theta_d$ can be transformed into desired linear positions $q_d$ of the actuators 404, 406, and 408.

The transformation represented by the block 904 may be expressed as a function that defines the relationship between the positions of the actuators 404, 406, and 408 and the angles of the foot 400. Assuming that $$q_d = \begin{bmatrix} q_1 \\ q_2 \\ q_3 \end{bmatrix}$$

represents the desired linear positions of actuators 404, 406, and 408, respectively, and $$\theta_d = \begin{bmatrix} \theta_1 \\ \theta_2 \end{bmatrix},$$

a function $f$ may be a transform matrix that transforms the desired angles $\theta_d$ to desired linear positions $q_d$ as follows:

$$q_d = f(\theta_d) \tag{1}$$

Elements of the function $f$ may be based on kinematic parameters of the ankle mechanism.

The calculations represented by equation 1 may thus be performed at the transmission block 904 to determine $q_d$.

At block 906, similar to the block 902, the desired positions $q_d$ of the actuators are limited due to physical constraints on motion of the actuators 404, 406, and 408, i.e., limits on motion of pistons of the actuators 404, 406, and 408. For instance, if the piston 502 is limited to move (e.g., extend) an amount of y centimeters (cm), and the desired position is greater than y cm, then the desired position is modified to be limited toy cm.

In an example, the robot may include position sensors coupled to the actuators 404, 406, and 408 to provide piston position information to the controller. The position information may include, for example, measurements of respective positions q of the pistons 502, 508, and 514 of the actuators 404, 406, and 408, respectively, in Cartesian coordinates. In another example, angle sensors may be coupled to joints of the robot to provide angle measurements to the controller. The controller may then use the function $f$ in equation 1 to determine linear positions of the pistons of the actuators 404, 406, and 408 that correspond to the measured angles.

At summation block 908, the sensed positions q are subtracted from the desired positions $q_d$ to determine an error (e) or discrepancy between actual positions q and desired positions q for the actuators 404, 406, and 408.

At gain block 910, the errors (e) are then multiplied by a gain matrix K determined by the controller. The matrix K is determined to meet particular criteria related to desired responses of the hydraulic system (e.g., speed of response, damping, controllability, stability, etc.). The output of the multiplication at the gain block 910 is provided as signals to the actuation system (e.g., signals to a hydraulic system including a source of pressurized fluid, hydraulic valves, etc. as described in FIGS. 8A and 8B).

Components of the control system 900 may be configured to work in an interconnected fashion with each other and/or with other components coupled to respective systems. One or more of the described operations or components of the control system 900 may be divided into additional operational or physical components, or combined into fewer operational or physical components. In some further examples, additional operational and/or physical components may be added to the examples illustrated by FIG. 9. Still further, any of the blocks 902, 904, 904, 908, and 910 may include or be provided in the form of a processor (e.g., a microprocessor, a digital signal processor (DSP), etc.) configured to execute program code including one or more instructions for implementing logical operations described herein. The control system 900 may further include any type of computer readable medium (non-transitory medium) or memory, for example, such as a storage device including a disk or hard drive, to store the program code. In an example, the control system 900 may be included within other systems.

IV. EXAMPLE TORQUE CONTROL SYSTEM

If the foot 400 is placed on a surface on which the robot operates, the controller may apply specific forces and torques on the surface by commanding the actuators 404, 406, and 408. Particularly, the controller may apply a roll torque on the surface by commanding the two actuators 404 and 406. Similarly, the controller may apply a pitch torque on the surface by controlling the hind actuator 408 and the anterior pair of actuators 404 and 406.

By controlling the roll and pitch torques, the controller may affect a location of a center of pressure (COP) of the foot 400. The COP is the term given to the point of application of the ground reaction force vector. The ground reaction force vector represents the sum of all forces acting between the foot 400 and its supporting surface.

Figure 10:
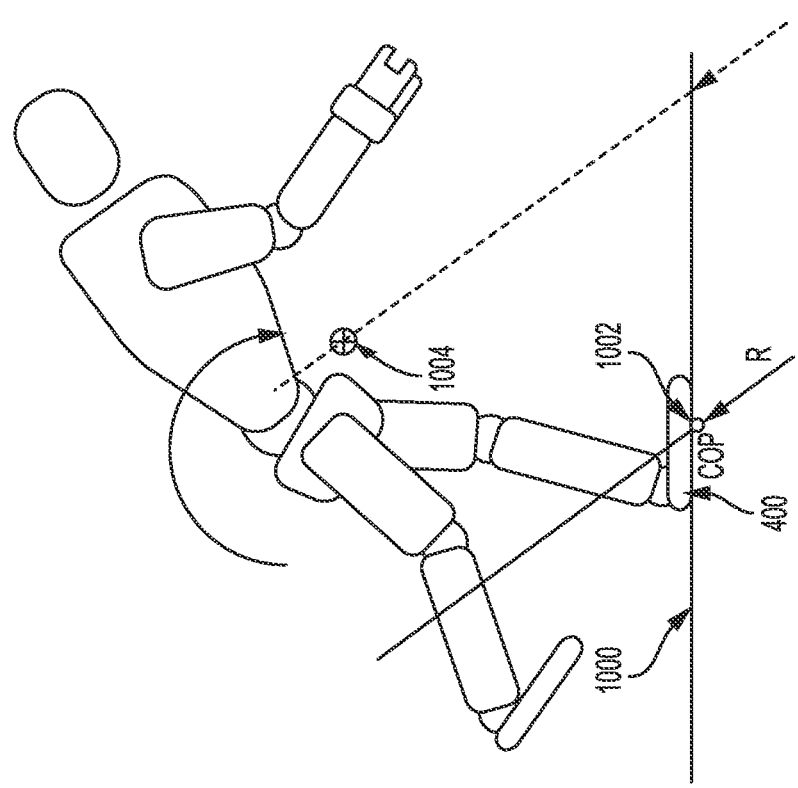
FIG. 10 illustrates effect of a location of a center of pressure on operation of the robot, in accordance with an example implementation.

FIG. 10 illustrates effect of a location of a COP on operation of a robot, in accordance with an example implementation. FIG. 10 illustrates the robot operating on a surface 1000. During operation of the robot on the surface 1000, a ground reaction force vector R represents the sum of all interaction forces between the robot and the surface 1000 (e.g., reaction force applied by the surface 1000 on the robot as the robot operates). The resultant force vector R acts at a COP 1002.

The COP 1002 is thus the point of application of the reaction force vector R applied by the surface 1000 on the robot. The COP 1002 is not static. For instance, during walking of the robot, the COP 1002 may be near a heel of the robot at the time of heel strike. The COP 1002 moves anteriorly throughout a step, and is located near toes of the robot at the toe-off phase of the step.

Further, the controller may change location of the COP 1002 to control forward speed of the robot. For example, the robot may slow down by commanding the robot to press its foot 400 down to move the COP 1002 toward toes of the foot 400. Conversely, by moving the COP 1002 toward a heel of the foot 400, the robot may speed up.

The location of the COP 1002 may also affect balance of the robot. The resultant force vector R causes a moment to be applied at a center of mass (COM) 1004 of the robot. The robot is considered rotationally stable (i.e., the robot maintains its balance) if the moment computed at the COM 1004 sums up to a zero moment. According to principles of mechanics, the resultant external moment on the robot is equal to the rate of change of angular momentum $\dot{H}_{COM}$ about the COM 1004.

For a rotationally stable robot, i.e., a robot that is not tipping, the centroidal rate of change of angular momentum $\dot{H}_{COM}$ should be zero or within a threshold value from zero. If the resultant force vector R, which is applied at the COP 1002, passes through the COM 1004, a zero moment is generated around the COM 1004. Thus, the rate of change of centroidal angular momentum $\dot{H}_{COM}$ about the COM 1004 is zero and the robot is rotationally stable. Conversely, if the resultant force vector R applied at the COP 1002 does not pass through the COM 1004, a non-zero moment may be generated around the COM 1004. Such a moment may cause the robot to tip or lean. Thus, the location of the COP 1002 may affect orientation of a body of the robot as well as stability of the robot.

Therefore, the controller of the robot may seek to control location of the COP 1002 to control operation of the robot (e.g., control the forward speed of the robot, orientation of the robot, stability of the robot, etc.). The controller may control the location of the COP 1002 by way of controlling forces/torques applied by the actuators 404, 406, and 406 on the surface 1000. Specifically, based on a desired location of the COP 1002, the controller may determine commands to an actuation system that operates the actuators. For example, if an electric actuation system operates the actuators, the controller may provide these commands to electric motors that operate the actuators. In another example, if a hydraulic actuation system operates the actuators such as the hydraulic systems shown in FIGS. 8A and 8B, the controller may provide the commands to the valves and source of fluid described in FIGS. 8A and 8B.

The commands to the actuation system (e.g., the hydraulic system) cause the actuators 404, 406, and 406 to apply forces on the foot 400. These forces cause the foot 400 to apply pitch and roll torques on the surface 1000. The controller may vary these torques to vary the COP location where R is applied on the foot 400 until the commanded COP is substantially achieved. The term "substantially achieved" indicates placing the COP within a threshold distance value (e.g., within ±1 cm) from the commanded COP. Thus, by commanding the foot 400 to apply particular roll and pitch torques on the surface 1000, the controller may achieve a desired or commanded COP location. An example control system that implements this process is described next.

Figure 11:
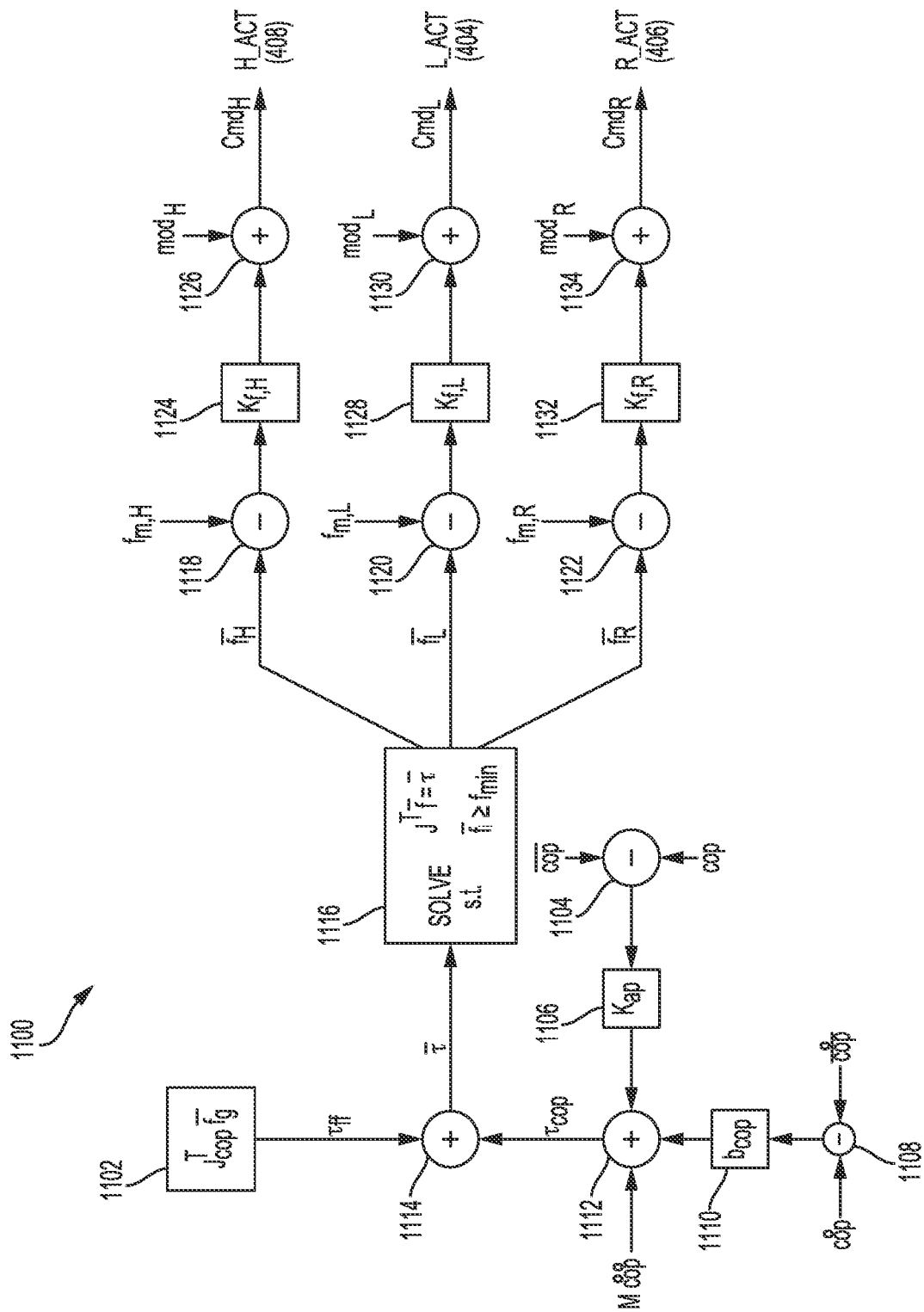
FIG. 11 illustrates an example torque control system, in accordance with an example implementation.

FIG. 11 illustrates an example torque control system 1100, in accordance with an example implementation. At block 1102, the controller determines desired forces $\vec{F}_g$ to be applied by the actuators 404, 406, and 406 to achieve a particular desired COP location. The controller may then determine desired torques using a Jacobian matrix $J_{COP}$ that transforms the desired forces $\vec{\theta}_g$ to corresponding desired feedforward torques $\tau_{ff}$. The controller may implement the following equation at the block 1102:

$$\tau_{ff} = J_{COP}^T \vec{F}_g \quad (2)$$

The superscript T designates a transpose of the Jacobian $J_{COP}$. The Jacobian $J_{COP}$ maps angular rates of change to actuator linear velocities. Elements of the Jacobian may be determined based on kinematics of members or links that form a leg of the robot, for example.

Sensors may be disposed on a sole of the foot 400 and may be configured to provide information to the controller that indicates an actual location of the COP 1002. For example, the sensors could be force sensors that provide measurements indicative of forces applied by the foot 400 on the surface 1000 (or reaction forces by the surface 1000 on the foot 400). The controller may be configured to resolve the actual location of the COP 1002 based on such force measurements. Other sensor types and configurations are possible.

The controller may further be configured to implement a feedback closed loop control system based on the measured and desired COP locations. The controller may, for instance, simulate dynamics of the COP 1002 as a second order system. Particularly, the controller may have access to a measured or actual location of the COP 1002 and may be configured to compare that actual location to a desired location $\overline{COP}$ at summation block 1104. The difference between the actual location and the desired location is an error or a discrepancy that is then multiplied by a proportional gain $K_{COP}$ at gain block 1106.

The controller may also determine a time rate of change (a derivative) of the measured COP location, i.e., $\dot{COP}$, and a time rate of change (a derivative) of the desired COP location, i.e., $\overline{\dot{COP}}$. The controller may compare the rates of change at summation block 1108 and multiply the difference by a damping term $b_{COP}$ at block 1110. Further, the controller may also determine a desired acceleration for the COP location, i.e., $\ddot{COP}$ and multiply that acceleration by a design parameter M to determine an inertial term $M \cdot \ddot{COP}$. This inertial term, the output signal from the block 1108, and the output signal from the block 1106 are summed at summation block 1112 to determine a desired feedback torque $\tau_{COP}$.

The feedforward torque $\tau_{ff}$ and the feedback torque $\tau_{COP}$ are summed at summation block 1114 to determine a desired torque $\bar{\tau}$. The desired torque $\bar{\tau}$ is used at block 1116 to determine corresponding desired force $\bar{\mathcal{F}}$ to be applied by the actuators by solving the following equation:

$$J^T \bar{\mathcal{F}} = \bar{\tau} \quad (3)$$

where $J^T$ is a transpose of a Jacobian matrix J determined based on kinematics of the ankle mechanism of the robot, for example.

Solving equation (3) may be subject to several constraints. For example, the controller may impose a constraint on how small the desired forces can be. In other words, the controller may determine minimum values for the desired forces. As an example for illustration, the actuators 404, 406, and 408 may have push-only type pistons as described with respect to FIG. 5. In this example, the actuators 404, 406, and 408 cannot apply a pulling force. As such, the controller determines the minimum forces to be applied by the actuators so as to maintain contact in the spherical joints 504, 510, and 516. In this manner, the connecting rods 500, 506, and 512 may not separate from the corresponding pistons 502, 508, and 514, respectively.

If the desired forces are determined to be less than a minimum force, the controller modifies the determined desired force to be equal to the minimum force. Mathematically, the controller solves equation (3) subject to a constraint expressed by an inequality $\bar{\mathcal{F}}_i \geq \mathcal{F}_{min}$. $\bar{\mathcal{F}}_i$ is a desired force determine for an actuator i (any of the actuators 404, 406, and 408) and $\mathcal{F}_{min}$ is a minimum designated force below which the desired force should not be allowed to fall. As mentioned above, this minimum force may be determined to, for example, ensure that the connecting rods 500, 506, and 512 remain seated in the spherical joints 504, 510, and 516, respectively, as the pistons 502, 508, and 514 move. In examples, $\mathcal{F}_{min}$ could be different for each actuator.

Thus, the controller determines at block 1116 three desired forces $\bar{\mathcal{F}}_H$, $\bar{\mathcal{F}}_L$, and $\bar{\mathcal{F}}_R$ to be applied by the actuators 408, 404, and 406, respectively. These forces would cause roll and pitch torques to be applied by the foot 400 on the surface 1000 so as to place the COP at a desired location.

At summation block 1118, a force $\mathcal{f}_{m,H}$ may be added to or subtracted from $\bar{\mathcal{F}}_H$. For example, the force $\mathcal{f}_{m,H}$ may be subtracted from $\bar{\mathcal{F}}_H$ to ensure that the modified desired force resulting from the block 1118 is below a threshold maximum allowable force. Such a threshold maximum allowable force may, for example, take into consideration design strength limitations of the actuator 408. Similarly, at summation block 1120, a force $\mathcal{f}_{m,L}$ may be added to or subtracted from $\bar{\mathcal{F}}_L$, and at summation block 1122 a force $\mathcal{f}_{m,R}$ may be added to or subtracted from $\bar{\mathcal{F}}_R$.

At gain block 1124 the modified desired hind force resulting from the summation block 1118 is multiplied by a force gain $K_{f,H}$. At summation block 1126, another force term, $mod_H$, is added to the force resulting from the gain block 1124. The force term $mod_H$ may, for example, accommodate any limitations related to a particular hydraulic system pressure relief value, or improving force tracking, i.e., achieving a desired force with minimum errors. Similarly, at gain block 1128 the modified desired left actuator force resulting from the block summation 1120 is multiplied by a force gain $K_{f,L}$. At summation block 1130, a force term $mod_L$ is added to the force resulting from the gain block 1128. Also, at gain block 1132, the modified desired right actuator force resulting from the block 1122 is multiplied by a force gain $K_{f,R}$. At summation block 1134, a force term $mod_R$ is added to the force resulting from the gain block 1132. Similar to the force term $mod_H$, the force terms $mod_L$ and $mod_R$ may take into account a pressure relief value and force tracking performance.

Force signals $cmd_H$, $cmd_L$, and $cmd_R$ resulting from the summation blocks 1126, 1130, and 1134, respectively, are used to actuate the hind actuator 408, the left actuator 404, and the right actuator 406, respectively, to achieve the determined desired force levels. For instance, the controller may provide these $cmd_H$, $cmd_L$, and $cmd_R$ signals to the valves (e.g., the valves 812, 814, and 816 or the valves 822 and 830), which control the actuators 404, 406, and 408. The desired force levels in turn substantially achieve commanded torques, which are determined to locate the COP 1002 at a particular location. The term "substantially achieve," is used herein to indicate achieving a torque within a threshold torque value (e.g., within ±5 N·m) from the desired torque.

Components of the control system 1100 may be configured to work in an interconnected fashion with each other and/or with other components coupled to respective systems. One or more of the described operations or components of the control system 1100 may be divided into additional operational or physical components, or combined into fewer operational or physical components. In some further examples, additional operational and/or physical components may be added to the examples illustrated by FIG. 11. Still further, less components or parts of the control system 1100 may be used. For instance, in some examples, the desired torque $\bar{\tau}$ may be based on either $\tau_{ff}$ or $\tau_{COP}$, but not both. Further, any of the blocks 1102-1134 may include or be provided in the form of a processor (e.g., a microprocessor, a digital signal processor (DSP), etc.) configured to execute program code including one or more instructions for implementing logical operations described herein. The control system 1100 may further include any type of computer readable medium (non-transitory medium) or memory, for example, such as a storage device including a disk or hard drive, to store the program code. In an example, the control system 1100 may be included within other systems.

Further, although the torque control system 1100 is described above using three actuators and a hydraulic system, the control system 1100 may be extended to a different number of actuators and different actuation mechanisms (e.g., electric actuation mechanism).

The maximum achievable forces to be applied by the actuators 404, 406, and 408 could be limited. For example, the maximum achievable forces could be limited by maximum hydraulic system pressure. For instance, the maximum hydraulic pressure of the fluid that the source 818 is capable of providing may be $P_{max}$ (e.g., 3000 psi). An area of a piston of an actuator (e.g., the piston 502 of the actuator 404) on which the pressure $P_{max}$ acts may be an area A. In this case, the maximum force that the actuator could apply is $F_{max}=P_{max}\cdot A$. The other two actuators also have similar limitations. In examples, pressures higher than system pressures could be achieved. For instance, regeneration and other techniques could be used to increase pressure in chambers of the actuators beyond the maximum hydraulic pressure of the source 818. However, the maximum force may still be limited so as to avoid physical damage to an actuator.

Thus, the torques that the foot 400 could apply on the surface 1000 to place the COP 1002 at a particular location are limited as well. Such a limitation on torques in turn limits possible locations at which the COP 1002 could be placed.

FIGS. 12A-12C illustrate possible locations of the COP 1002 of the foot 400 based on pitch and roll angles of the foot 400, in accordance with an example implementation. In FIGS. 12A-12C, an area within or defined by solid line 1200 represents a boundary of an area where the controller could place the COP 1002 by operating the actuators 404, 406, and 408. The controller could place the COP 1002 within the area defined by the line 1200 when the robot is required to handle its own body weight.

The controller could place the COP 1002 within the area defined by a dashed line 1202 when the robot is required to handle double its own body weight. For instance, the robot may have to push on the ground surface to accelerate upward (e.g., to take an upward step on a platform) and/or may be carrying a load. Such acceleration may amount to the robot carrying more than its own weight as the robot has to overcome gravity acting on the robot's body as well as accelerate upward against gravity. As depicted in FIGS. 12A-12C, the area defined within the boundaries of the line 1202 is smaller than the respective area defined within the boundaries of the line 1200. The size of the areas defined by the lines 1200 and 1202 depends on or varies with a mass of the robot.

The possible COP locations are also limited to the areas within the lines 1200 and 1202 by limitations on magnitude of torques to be applied by the foot 400 on the surface 1000. As mentioned above, the limitations of torques are determined by limitations on magnitude of forces that could be applied by the actuators 404, 406, and 408.

Further, as shown in FIGS. 12A-12C, size and shape of the areas defined within the lines 1200 and 1202 vary based on roll and pitch angles of the foot 400. For example, FIG. 12A illustrates possible locations where the controller could place the COP 1002 when the roll angle is 0° and the pitch angle is −40°. The negative sign indicates toe-up or pitch backward position. FIG. 12B illustrates possible locations where the controller could place the COP 1002 when the roll and pitch angles are both 0°, i.e., the foot 400 is flat. FIG. 12C illustrates possible locations where the controller could place the COP 1002 when the roll angle is 0° and the pitch angle is 40°. A positive sign indicates toe-down or pitch forward position. The size and shapes defined within the lines 1200 and 1200 would also vary with roll angle of the foot 400.

Sensors, such as sensors 1204A, 1204B, 1204C, and 1204D, may be disposed on the foot 400 and may be configured to provide information to the controller that indicates an actual location of the COP 1002. For example, the sensors 1204A, 1204B, 1204C, and 1204D could be force sensors that provide measurements indicative of forces applied by the foot 400 on the surface 1000 (or reaction forces applied by the surface 1000 on the foot 400). The controller may be configured to resolve the actual location of the COP 1002 based on such force measurements. For instance, the controller may determine magnitude and direction of action a force that is equivalent to the four forces sensed by the sensors 1204A, 1204B, 1204C, and 1204D. A location of the foot 400 through which the direction of action of that equivalent force pass may be the location of the COP 1002.

The controller may use this information along with commanded COP location information to determine commands to the hydraulic system as described with respect to FIG. 11 above. The commands to the hydraulic system determine forces to be applied by the actuators 404, 406, and 408 on the foot 400. These forces cause the foot 400 to apply pitch and roll torques on the surface 1000 to achieve the commanded COP is achieved.

However, if the desired location of the COP is not within the possible locations shown in FIGS. 12A-12C, or if the torques required to achieve a particular COP location exceed physical limitations on torque magnitudes, the controller may modify the commanded torques.

Figure 13A:
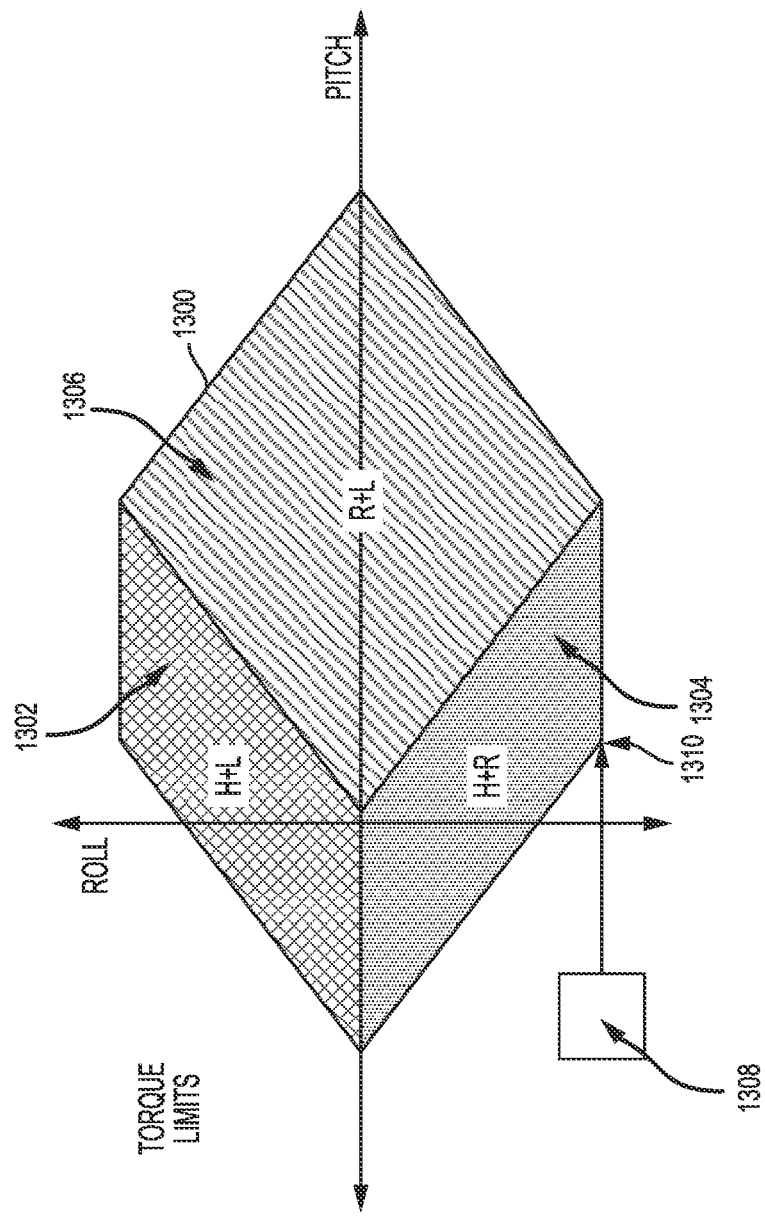
FIGS. 13A, 13B, and 13C illustrate possible scenarios of torque modification, in accordance with example implementations.
Figure 13B:
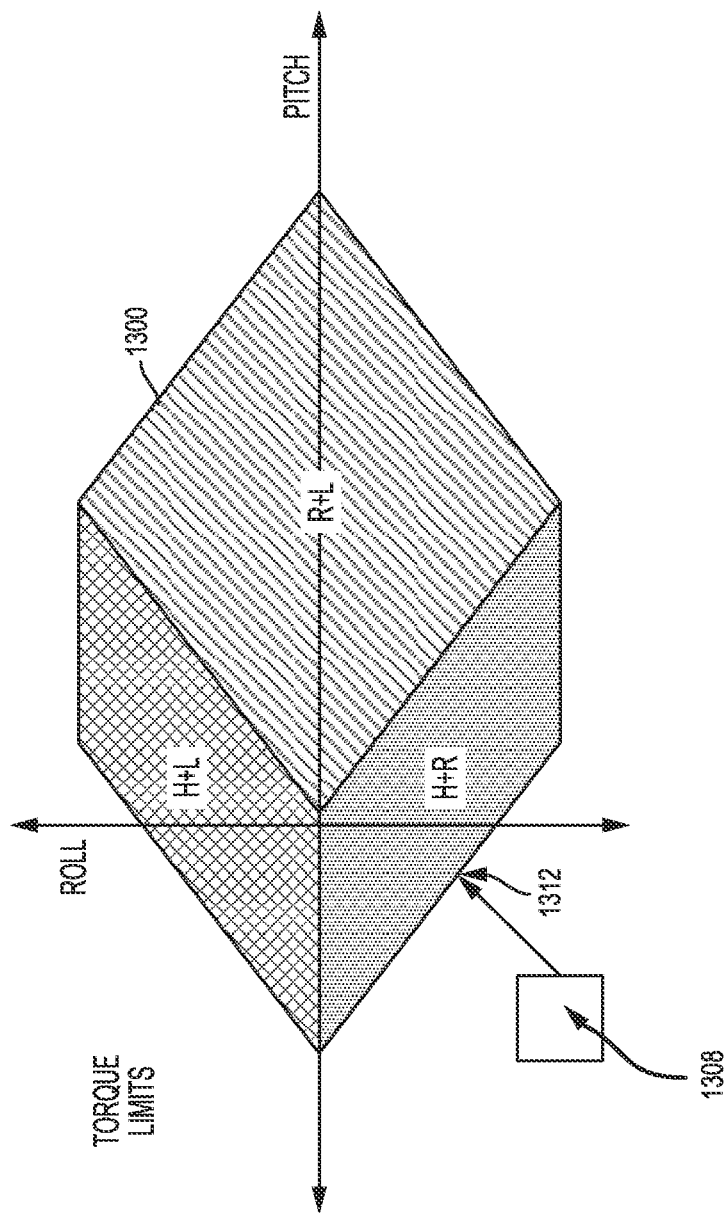
Figure 13C:
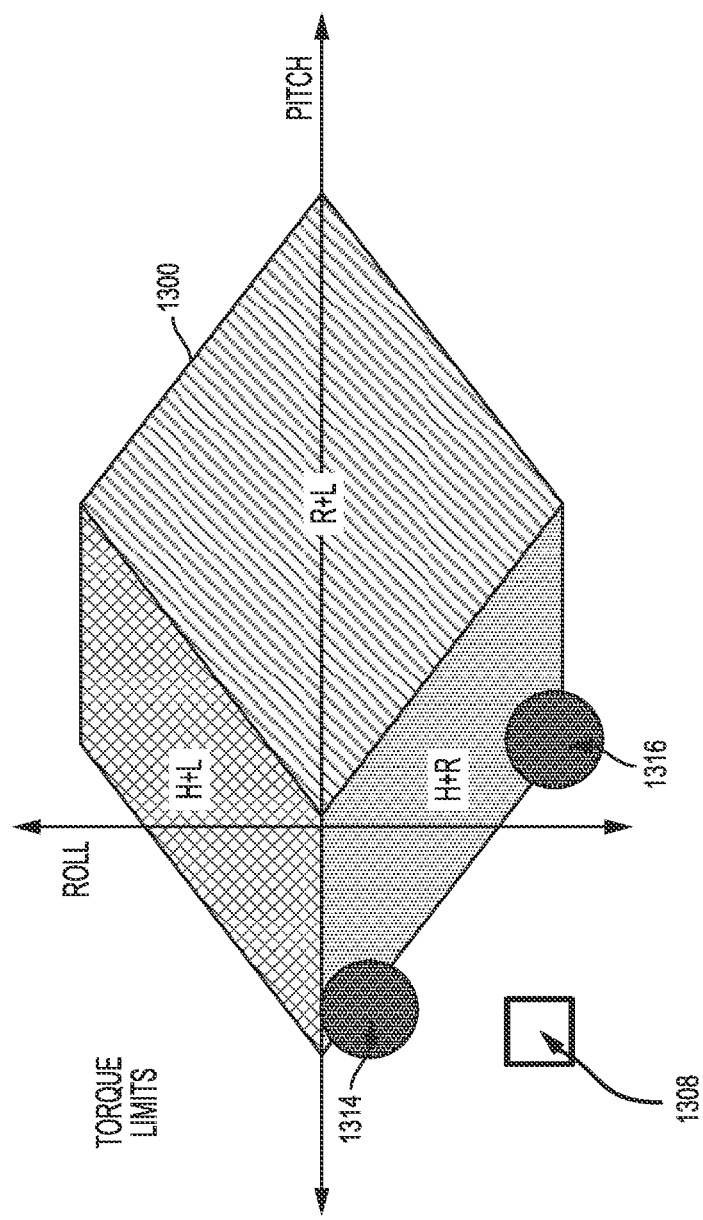

FIGS. 13A-13C illustrate possible scenarios of torque modification, in accordance with example implementations. In FIGS. 13A-13C, "H" refers to the hind actuator 408, "L" refers to the left anterior actuator 404 and "R" refers to the right anterior actuator 406. The controller may determine a torque envelope 1300 based on physical limitations on magnitudes of forces that could be applied by the actuators 404, 406, and 408, which limit corresponding torques. If the controller determines that the pitch and roll torques that would achieve a particular location of the COP 1002 are within a torque envelope 1300, the controller may command the actuators 404, 406, and 406 to achieve such torques.

As examples, if the controller determines that the pitch and roll torques that would achieve a particular location of the COP 1002 are within an area 1302, then the controller may command the actuators 404 and 408 to achieve the determined torques. If the controller determines that the pitch and roll torques that would achieve a particular location of the COP 1002 are within an area 1304, then the controller may command the actuators 406 and 408 to achieve the determined torques. Similarly, if the controller determines that the pitch and roll torques that would achieve a particular location of the COP 1002 are within an area

1306, then the controller may command the actuators 404 and 406 to achieve the determined torques.

However, as mentioned above, in some examples, the torques to be applied by the foot 400 on the surface 1000 to achieve a particular location for the COP 1002 may be outside the envelope 1300, as illustrated by a desired pitch and roll torques point 1308. The point 1308 represents negative pitch and roll torques that should be applied by the foot 400 on the surface 1000 to achieve a desired location for the COP 1002. However, due to physical limitations, the torques represented by the point 1308 is not achievable. In this case, the controller may modify the desired torques to accommodate the physical limitations of the actuators 404, 406, and 408.

In examples, the controller may prioritize roll torque over pitch torque or vice versa. For instance, as illustrated in FIG. 13A, the controller may prioritize roll torque over pitch torque. Thus, the controller effectively moves the point 1308 horizontally to a corresponding point 1310 on the envelope 1300. In this manner, the desired roll torque does not change; however, the desired pitch torque is modified. In the example illustrated in FIG. 13A, the change in the pitch torque is sufficiently significant to flip a sign of the pitch torque from a negative sign to a positive sign. The robot may become unstable in this case. As an example for illustration, the negative pitch torque represented by the point 1308 may be determined by the control system in FIG. 11 so as to place the COP 1002 at a particular location that renders the robot stable. Flipping the pitch torque sign from negative to positive by moving the point 1308 to the point 1310 may significantly alter the location of the COP 1002, rendering the robot unstable. For instance, the robot may launch itself backwards and cause itself to be unstable. In other examples, the controller may prioritize pitch torque over roll torque.

In some examples, the controller may perform a tradeoff analysis and modify both the pitch and roll torques as illustrated in FIG. 13B. As shown in FIG. 13B, the controller may modify both the pitch and roll torques from the point 1308 to a corresponding point 1312 on the envelope 1300. In this manner, no sign change occurs in either the pitch or roll torques.

In other examples, the controller may assign weights to both the pitch torque and the roll torque. In some scenarios, the pitch torque may be assigned a larger weight than the roll torque. In these scenarios, the controller may modify the torques by moving the point 1308 to a region 1314 shown in FIG. 13C. In other scenarios, the roll torque may be assigned a larger weight than the pitch torque, and the controller may modify the torques by moving the point 1308 to a region 1316. In examples, the size and shape of the regions 1314 and 1316 may vary based on the particular scenario.

V. EXAMPLE METHODS

Figure 14:
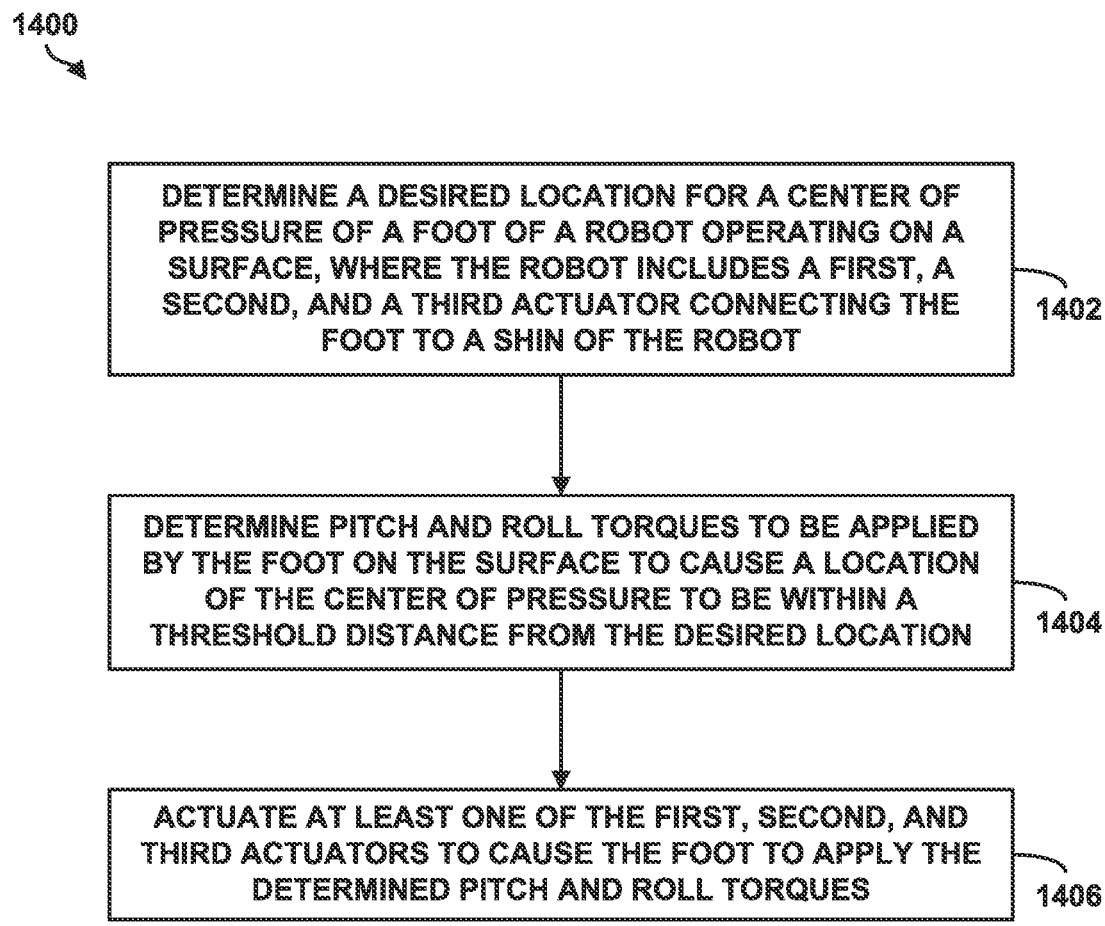
FIG. 14 is a flow chart of a method for controlling a three-piston ankle mechanism of a legged robot, in accordance with an example implementation.

FIG. 14 is a flow chart 1400 for controlling a three-piston ankle mechanism of a legged robot, in accordance with an example implementation. The flow chart 1400 may include one or more operations, or actions as illustrated by one or more of blocks 1402-1406. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the flow chart 1400 and other processes and operations disclosed herein, the flow chart shows operation of one possible implementation of present examples. In this regard, each block may represent a module, a segment, or a portion of program code, which includes one or more instructions executable by a processor or a controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the flow chart 1400 and other processes and operations disclosed herein, one or more blocks in FIG. 14 may represent circuitry or digital logic that is arranged to perform the specific logical operations in the process.

At block 1402, the flow chart 1400 includes determining a desired location for a center of pressure of a foot of a robot operating on a surface. As described above, the robot includes a first actuator (e.g., the actuator 404) and a second actuator (e.g., the actuator 406) connecting a first (e.g., anterior) portion of the foot (e.g., the foot 400) to a shin (e.g., the shin 402) of the robot. Extension of the first actuator accompanied by retraction of the second actuator causes the foot to roll in a first roll direction (e.g., counter-clockwise) relative to the shin. Retraction of the first actuator accompanied by extension of the second actuator causes the foot to roll in a second roll direction (e.g., clockwise) opposite to the first roll direction relative to the shin.

The robot further includes a third actuator (e.g., the hind actuator 408) connecting a second (e.g., posterior) portion of the foot to the shin. Extension of the third actuator accompanied by retraction of one of or both the first and second actuators causes the foot to pitch in a first pitch direction (e.g., pitch backward or toe-up) relative to the shin. Retraction of the third actuator accompanied by extension of one of or both the first and second actuators causes the foot to pitch in a second pitch direction (e.g., pitch forward or toe-down) opposite to the first pitch direction relative to the shin.

As described above with respect to FIG. 10, a controller of the robot may determine a desired location of a COP of the foot to balance the robot, control orientation of the robot, control speed of the robot, etc. The controller may be configured to command a hydraulic system controlling the three actuators so as to operate the three actuators to achieve the desired location of the COP.

At block 1404, the flow chart 1400 includes determining pitch and roll torques to be applied by the foot on the surface to cause a location of the COP to be within a threshold distance from the desired location. As described with respect to FIG. 11, based on the desired COP location, the controller may implement a control system to determine desired forces to be applied by the three actuators. Based on either or both of the desired COP location and the desired forces, the controller may determine desired pitch and roll torques to be applied by the foot on the surface on which the robot operates to place the COP at the desired location.

In some examples as described with respect to FIGS. 13A-13C, the controller may determine that the desired pitch and roll torques are unachievable due to physical limitations of the actuators or the hydraulic system. In these examples, the controller may modify at least one of the pitch and roll torques to obtain a modified combination of pitch and roll torques that are achievable by actuating the first, second, and third actuators.

In modifying the pitch and/or roll torques the controller may prioritize either the roll torque or the pitch torque so as to maintain the prioritized torque substantially the same (i.e., within a threshold torque value from the desired torque), while modifying the other torque. In examples, the controller may modify both the roll and pitch torques so as to preclude a change of sign of the roll and pitch torques as described with respect to FIG. 13B.

At block 1406, the flow chart 1400 includes actuating at least one of the first, second, and third actuators to cause the foot to apply the determined pitch and roll torques. As described with respect to FIGS. 8A and 8B, the robot may include a hydraulic system that controls operation of the three actuators. The hydraulic system may include at least a source of pressurized hydraulic fluid configured to provide pressurized fluid through a hydraulic supply line to the rest of the hydraulic system. The hydraulic system may also include a reservoir (e.g., the reservoir 820) having low pressure fluid and configured, in some examples, to receive fluid discharged from the actuators.

The hydraulic system may also include a first valve (e.g., the valve 812) configured to control fluid flow from the source to the first actuator and from the first actuator to a hydraulic return line. A second valve (e.g., the valve 814) may be configured to control fluid flow from the source to the second actuator and from the second actuator to the hydraulic return line. A third valve (e.g., the valve 816) may be configured to control fluid flow from the source to the third actuator and from the third actuator to the hydraulic return line. The hydraulic return line may be a return line leading to the reservoir or may be a return line leading to another actuator or another chamber of the same actuator in case of regeneration. To actuate the first, second, and third actuators, the controller actuates the hydraulic system including the source and the first, second, and third valves.

In another example, as described in FIG. 8B, the first actuator includes a first chamber (e.g., the chamber 806) and the second actuator includes a second chamber (e.g., the chamber 808). The third actuator includes a third chamber (e.g., the chamber 810) and a fourth chamber (e.g., the chamber 811). Further, in this example, the hydraulic system may include a first valve (e.g., the valve 822) configured to control fluid flow from the source to either the first chamber (e.g., the chamber 806) of the first actuator or the third chamber (e.g., the chamber 810) of the third actuator. That first valve may also control fluid flow discharged from the other chamber (i.e., the first chamber or the third chamber) to a hydraulic return line. The hydraulic system may also include a second valve (e.g., the valve 830) configured to control fluid flow from the source to either the second chamber (e.g., the chamber 808) of the second actuator or the fourth chamber (e.g., the chamber 811) of the third actuator. That second valve may also control fluid flow discharged from the other chamber (i.e., the second chamber or the fourth chamber) to the hydraulic return line. To actuate the first, second, and third actuators, the controller may actuate the first and second valves.

Alternative, or in addition, to actuating at least one of the first, second, and third actuators to cause the foot to apply particular torques, the controller may actuate the actuators to place the foot in a particular desired orientation. As described with respect to FIG. 9, the controller may determine desired pitch and torque angles for the foot so as to place the foot in a desired orientation. The controller may then transform the desired pitch and roll angles into desired positions for the first, second, and third actuators (e.g., desired linear positions of pistons of the actuators 404, 406, and 408). The controller may then actuate at least one of the first, second, and third actuators to achieve the desired positions. Achieving the desired positions for the actuators may result in achieving the desired pitch and roll angles, and thus place the foot in the desired orientation.

VI. CONCLUSION

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A robotic leg comprising:
    a ground-engaging foot member having a longitudinal axis extending from a toe portion of the ground-engaging foot member to a heel portion of the ground-engaging foot member;
    an ankle member coupled to the ground-engaging foot member along the longitudinal axis of the ground-engaging foot member by a first coupling;
    a shin member coupled to the ankle member by a second coupling; and
    a first actuator extending along a length of the shin member toward the foot member, the first actuator coupled to the foot member by a third coupling,
    wherein the first coupling is located closer to a ground-engaging surface of the ground-engaging foot member than the second coupling.

2. The robotic leg of claim 1, wherein the third coupling is located at a position between a medial side of the ground-engaging foot member and a lateral side of the ground-engaging foot member.

3. The robotic leg of claim 1, wherein:
    the first coupling provides a roll axis of rotation for the ankle member to roll toward a medial side or a lateral side of the foot member; and
    the second coupling provides a pitch axis of rotation for the ankle member to pitch the toe portion of the foot member towards the shin member or away from the shin member.

4. The robotic leg of claim 1, wherein a first axis along a length of the first coupling is perpendicular to a second axis along a length of the second coupling.

5. The robotic leg of claim 1, wherein a second axis along a length of the second coupling is parallel to a third axis along a length of the third coupling.

6. The robotic leg of claim 1, wherein the ankle member is centrally disposed between a medial side and a lateral side of the ground-engaging foot member.

7. The robotic leg of claim 1, further comprising:
a second actuator coupled to the foot member by the third coupling,
wherein actuation of one of the first actuator or the second actuator rolls the foot member laterally.

8. The robotic leg of claim 1, further comprising a second actuator coupled to the ankle member by a fourth coupling, the fourth coupling disposed at a heel-adjacent portion of the ankle member.

9. The robotic leg of claim 1, further comprising:
a second actuator coupled to the foot member by the third coupling; and
a third actuator coupled to the ankle member by a fourth coupling, the fourth coupling disposed at an end of the ankle member opposite the third coupling.

10. The robotic leg of claim 1, wherein the shin member couples to the ankle member along an outer surface of the ankle member between a medial side and a lateral side of the ground-engaging foot member.

11. A robotic leg comprising:
a ground-engaging foot member having a longitudinal axis extending from a toe portion of the ground-engaging foot member to a heel portion of the ground-engaging foot member;
an ankle member coupled to the ground-engaging foot member along the longitudinal axis of the ground-engaging foot member by a first coupling, the ankle member axially rotatable about the first coupling;
a shin member coupled to the ankle member by a second coupling, the shin member comprising at least one elongated actuator chamber extending along a length of the shin member; and
a first actuator partially housed within the at least one elongated actuator chamber, the first actuator comprising a piston slidably received within the at least one elongated actuator chamber, the first actuator extending from the shin member and coupling to the foot member by a third coupling.

12. The robotic leg of claim 11, wherein the third coupling is located at a position between a medial side of the ground-engaging foot member and a lateral side of the ground-engaging foot member.

13. The robotic leg of claim 11, wherein:
the first coupling provides a roll axis of rotation for the ankle member to roll toward a medial side or a lateral side of the foot member; and
the second coupling provides a pitch axis of rotation for the ankle member to pitch the toe portion of the foot member towards the shin member or away from the shin member.

14. The robotic leg of claim 13, wherein the roll axis is closer to a ground-engaging surface of the ground-engaging foot than the pitch axis.

15. The robotic leg of claim 11, wherein a first axis along a length of the first coupling is perpendicular to a second axis along a length of the second coupling.

16. The robotic leg of claim 11, wherein a second axis along a length of the second coupling is parallel to a third axis along a length of the third coupling.

17. The robotic leg of claim 11, wherein the ankle member is centrally disposed between a medial side and a lateral side of the ground-engaging foot member.

18. The robotic leg of claim 11, further comprising:
a second actuator coupled to the foot member by the third coupling,
wherein actuation of one of the first actuator or the second actuator rolls the foot member laterally.

19. The robotic leg of claim 11, further comprising a second actuator coupled to the ankle member by a fourth coupling at a heel-adjacent portion of the ankle member.

20. The robotic leg of claim 11, further comprising:
a second actuator coupled to the foot member by the third coupling; and
a third actuator coupled to the ankle member by a fourth coupling, the fourth coupling at an end of the ankle member opposite the third coupling.

21. The robotic leg of claim 11, wherein the shin member couples to the ankle member along an outer surface of the ankle member between a medial side and a lateral side of the ground-engaging foot member.

* * * * *